US012626699B2

(12) United States Patent
Kamai et al.

(10) Patent No.: US 12,626,699 B2
(45) Date of Patent: May 12, 2026

(54) VOICE RECOGNITION DEVICE, VOICE RECOGNITION METHOD, AND NON-TRANSITORY COMPUTER READABLE RECORDING MEDIUM

(71) Applicant: Panasonic Intellectual Property Corporation of America, Torrance, CA (US)

(72) Inventors: Takahiro Kamai, Kyoto (JP); Katsunori Daimo, Osaka (JP); Misaki Doi, Osaka (JP); Kousuke Itakura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 260 days.

(21) Appl. No.: 18/527,928

(22) Filed: Dec. 4, 2023

(65) Prior Publication Data

US 2024/0105174 A1 Mar. 28, 2024

Related U.S. Application Data

(63) Continuation of application No. PCT/JP2022/018594, filed on Apr. 22, 2022.

(30) Foreign Application Priority Data

Jun. 7, 2021 (JP) ................................. 2021-095208

(51) Int. Cl.
*G10L 15/22* (2006.01)
*B60R 16/037* (2006.01)
(Continued)

(52) U.S. Cl.
CPC .......... *G10L 15/22* (2013.01); *B60R 16/0373* (2013.01); *G10L 15/01* (2013.01);
(Continued)

(58) Field of Classification Search
CPC ......... G10L 15/22; G10L 15/01; G10L 15/02; G10L 15/10; G10L 15/30; G10L 2015/223; G10L 17/06; B60R 16/0373; B60R 16/02
(Continued)

(56) References Cited

U.S. PATENT DOCUMENTS 5,852,804 A 12/1998 Sako
6,081,263 A * 6/2000 LeGall ............... H04N 21/4351
715/717
(Continued)

FOREIGN PATENT DOCUMENTS

JP 04-204700 7/1992
JP 2004-233542 8/2004
(Continued)

OTHER PUBLICATIONS

Extended European Search Report (EESR) from European Patent Office (EPO) in European Patent Appl. No. 22819962.6, dated Aug. 23, 2024.
(Continued)

*Primary Examiner* — Thuykhanh Le
(74) *Attorney, Agent, or Firm* — Greenblum & Bernstein, P.L.C.

(57) ABSTRACT

A voice recognition device includes an estimation unit that compares a plurality of pieces of registration voice data stored in a database with input voice data uttered by a speaker who gets on a mobile body to estimate a registration command corresponding to the input command, a presentation unit that presents an estimation result, a second acquisition unit that acquires an error instruction indicating that the estimation result is an error, a determination unit that, in a case where the error instruction is acquired, determines a correct command corresponding to the input command
(Continued)

based on an operation by the speaker, and a database management unit that stores the correct command and the input voice data in the database in association with each other.

13 Claims, 19 Drawing Sheets

(51) Int. Cl.

| | |
|---|---|
| *G10L 15/01* | (2013.01) |
| *G10L 15/02* | (2006.01) |
| *G10L 15/10* | (2006.01) |
| *G10L 15/30* | (2013.01) |

(52) U.S. Cl.
CPC .............. *G10L 15/02* (2013.01); *G10L 15/10* (2013.01); *G10L 15/30* (2013.01); *G10L 2015/223* (2013.01)

(58) Field of Classification Search
USPC ........................................... 704/251
See application file for complete search history.

(56) References Cited

U.S. PATENT DOCUMENTS

| | | | | |
|---|---|---|---|---|
| 6,201,540 | B1* | 3/2001 | Gallup .................. | B60K 35/22 |
| | | | | 701/36 |
| 10,079,024 | B1* | 9/2018 | Bhimanaik ............ | G10L 17/02 |
| 10,140,076 | B2* | 11/2018 | Iwamoto ................ | G06F 3/147 |
| 10,462,285 | B2* | 10/2019 | Hodge .................. | H04M 17/30 |
| 11,164,215 | B1* | 11/2021 | Tushinskiy ........ | G06Q 30/0277 |
| 11,830,501 | B2* | 11/2023 | Choi .................... | G06F 40/295 |
| 12,067,980 | B2* | 8/2024 | Lee .......................... | G06F 3/167 |
| 2002/0184043 | A1* | 12/2002 | Lavorgna, Jr. ........ | G06F 16/972 |
| | | | | 707/E17.117 |
| 2004/0172256 | A1* | 9/2004 | Yokoi ..................... | G10L 15/22 |
| | | | | 704/E15.044 |
| 2005/0080627 | A1* | 4/2005 | Hennebert ............. | G10L 15/22 |
| | | | | 704/E15.04 |
| 2005/0177376 | A1* | 8/2005 | Cooper ................. | G10L 15/065 |
| | | | | 704/277 |
| 2005/0261903 | A1* | 11/2005 | Kawazoe ............. | G10L 15/065 |
| | | | | 704/E15.013 |
| 2009/0299752 | A1* | 12/2009 | Rodriguez ........... | G06F 40/242 |
| | | | | 704/E15.001 |
| 2010/0328426 | A1* | 12/2010 | Matsubara ............. | H04N 13/10 |
| | | | | 348/E13.001 |
| 2012/0054597 | A1* | 3/2012 | Yamada ................ | G06F 40/143 |
| | | | | 715/234 |
| 2012/0287449 | A1* | 11/2012 | Kim ................... | G03G 15/5058 |
| | | | | 358/1.9 |
| 2012/0304057 | A1* | 11/2012 | Labsky ................... | G10L 13/00 |
| | | | | 715/256 |
| 2013/0218572 | A1* | 8/2013 | Cho ....................... | G10L 15/22 |
| | | | | 704/E21.001 |
| 2013/0268292 | A1* | 10/2013 | Kim ....................... | G16H 40/67 |
| | | | | 705/2 |
| 2013/0268998 | A1* | 10/2013 | Ko ........................ | H04W 12/08 |
| | | | | 726/3 |
| 2014/0006034 | A1* | 1/2014 | Takeuchi ................ | B66B 1/468 |
| | | | | 704/275 |
| 2014/0055375 | A1* | 2/2014 | Kim ..................... | G06F 1/1652 |
| | | | | 345/173 |
| 2014/0122089 | A1* | 5/2014 | Lee ......................... | G10L 15/00 |
| | | | | 704/275 |

| | | | | |
|---|---|---|---|---|
| 2014/0188477 | A1* | 7/2014 | Zhang ..................... | G10L 15/22 |
| | | | | 704/257 |
| 2014/0214430 | A1* | 7/2014 | Wang .............. | H04N 21/42222 |
| | | | | 704/275 |
| 2015/0154976 | A1* | 6/2015 | Mutagi ................... | G06F 3/167 |
| | | | | 704/275 |
| 2015/0206529 | A1* | 7/2015 | Kwon ..................... | G10L 17/22 |
| | | | | 704/246 |
| 2015/0279354 | A1* | 10/2015 | Gruenstein ............. | G10L 15/22 |
| | | | | 704/235 |
| 2015/0332067 | A1* | 11/2015 | Gorod ................... | G06F 3/0482 |
| | | | | 726/26 |
| 2016/0019217 | A1* | 1/2016 | Reblitz-Richardson ..................... |  |
| | | | | G06F 16/24578 |
| | | | | 707/731 |
| 2016/0088229 | A1* | 3/2016 | Park ........................ | B43L 13/18 |
| | | | | 348/239 |
| 2016/0110010 | A1* | 4/2016 | Lee ..................... | H04M 1/0235 |
| | | | | 345/173 |
| 2016/0293164 | A1* | 10/2016 | Shi ........................ | G10L 15/1815 |
| 2017/0010859 | A1* | 1/2017 | Hirai ........................ | G06F 3/167 |
| 2017/0123340 | A1* | 5/2017 | Sobue .................. | G03G 15/011 |
| 2018/0067920 | A1* | 3/2018 | Cho ........................ | G06F 40/242 |
| 2018/0121060 | A1* | 5/2018 | Jeong ................... | G06F 9/44505 |
| 2018/0168755 | A1* | 6/2018 | Cagle ..................... | A61B 34/25 |
| 2018/0350144 | A1* | 12/2018 | Rathod ................... | H04L 51/10 |
| 2019/0214022 | A1* | 7/2019 | Vaquero Avilés-Casco ................ |  |
| | | | | G10L 17/00 |
| 2019/0279625 | A1* | 9/2019 | Huang .................... | G06F 3/0484 |
| 2019/0355351 | A1* | 11/2019 | Kim ..................... | G10L 15/22 |
| 2020/0057923 | A1* | 2/2020 | Song ........................ | G06N 3/08 |
| 2020/0162708 | A1* | 5/2020 | Chung ................. | H04N 9/3155 |
| 2020/0227034 | A1* | 7/2020 | Summa ................. | G10L 15/22 |
| 2021/0056974 | A1* | 2/2021 | Kim ........................ | G06F 1/3231 |
| 2021/0125613 | A1* | 4/2021 | Goh ...................... | G10L 15/22 |
| 2021/0183362 | A1* | 6/2021 | Koji ........................ | G10L 15/22 |
| 2021/0216275 | A1* | 7/2021 | Iwasaki .................. | G06F 3/167 |
| 2021/0295839 | A1* | 9/2021 | Xu ...................... | G06F 3/167 |
| 2021/0327424 | A1* | 10/2021 | Lee ....................... | G10L 15/22 |
| 2021/0327427 | A1* | 10/2021 | Liu ......................... | G06F 16/45 |
| 2021/0409538 | A1* | 12/2021 | Zhu ................... | H04M 1/72472 |
| 2022/0031068 | A1* | 2/2022 | Jang ........................ | G06V 10/26 |
| 2022/0036882 | A1* | 2/2022 | Ahn ........................ | G10L 15/08 |
| 2022/0101846 | A1* | 3/2022 | Lee ........................... | G01S 5/18 |
| 2022/0118926 | A1* | 4/2022 | Park ................... | B60R 16/0373 |
| 2022/0321951 | A1* | 10/2022 | Chandrashekar .......................... |  |
| | | | | H04N 21/44016 |
| 2022/0375469 | A1* | 11/2022 | Yang ..................... | G10L 13/027 |
| 2022/0392447 | A1* | 12/2022 | Goriparti ................ | G06F 3/167 |
| 2023/0139640 | A1* | 5/2023 | Sugimoto .............. | B60R 25/31 |
| | | | | 704/257 |
| 2023/0221066 | A1* | 7/2023 | Kong ..................... | G06F 3/167 |
| 2023/0410808 | A1* | 12/2023 | Kurzhals .............. | A61F 11/145 |
| 2024/0087570 | A1* | 3/2024 | Kamai ................... | G10L 15/20 |

FOREIGN PATENT DOCUMENTS

| | | |
|---|---|---|
| JP | 2005-204975 | 8/2005 |
| JP | 2006-058479 | 3/2006 |
| JP | 2009-116277 | 5/2009 |

OTHER PUBLICATIONS

International Search Report issued in International Pat. Appl. No. PCT/JP2022/018594, dated Jul. 19, 2022, along with an English translation thereof.

* cited by examiner

| SPEAKER ID | REGISTRATION COMMAND ID | FEATURE AMOUNT |
|---|---|---|
| U1 | C1 | |
| U1 | C2 | |
| U1 | C3 | |
| U1 | C4 | |
| U1 | C5 | |
| ... | ... | |

COMMAND IS RECEIVED

EXECUTE

"RAISE TEMPERATURE"

FIG.11

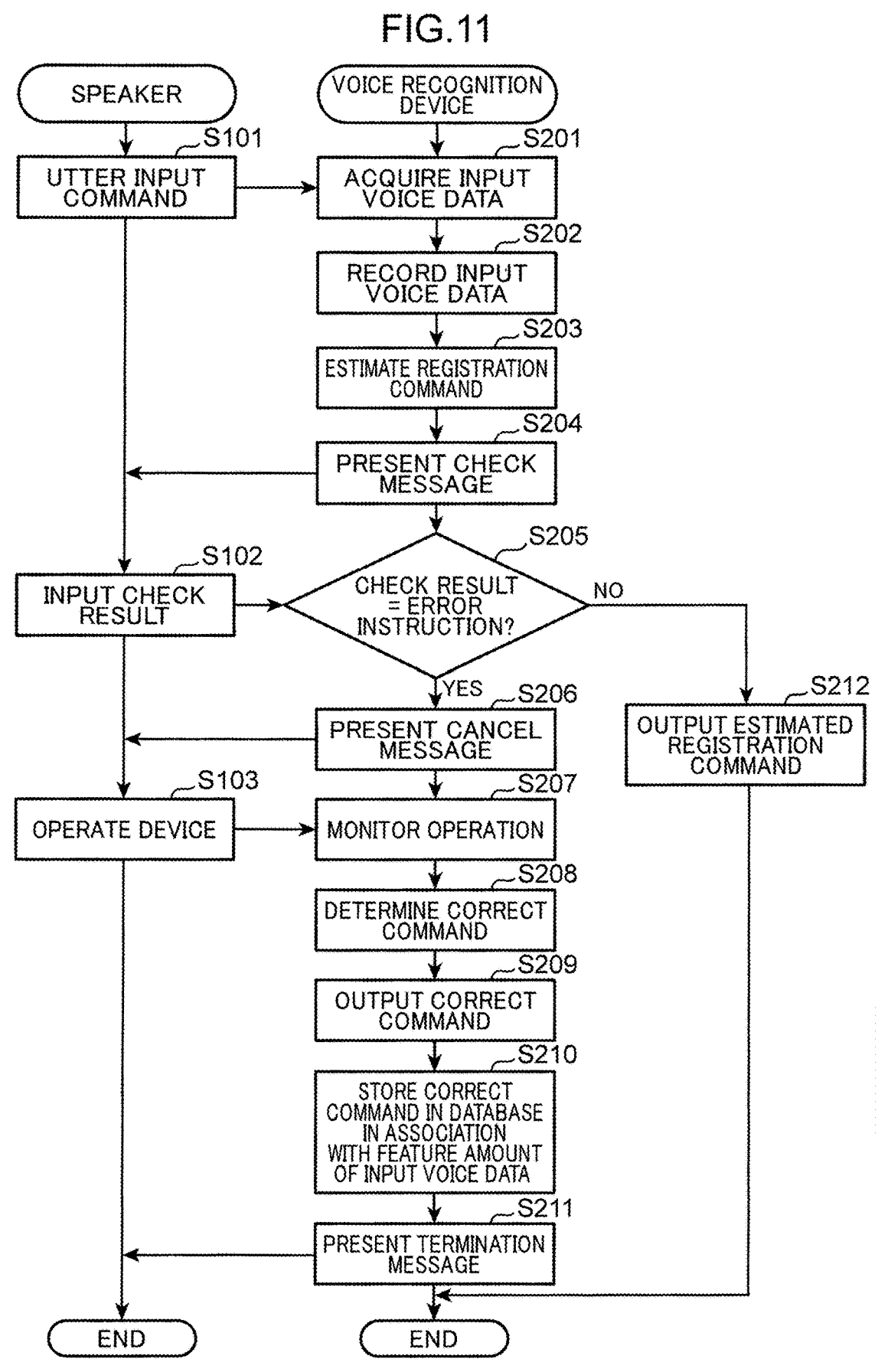

SPEAKER

VOICE RECOGNITION DEVICE

S101
UTTER INPUT COMMAND

S201
ACQUIRE INPUT VOICE DATA

S202
RECORD INPUT VOICE DATA

S203
ESTIMATE REGISTRATION COMMAND

S204
PRESENT CHECK MESSAGE

S102
INPUT CHECK RESULT

S205
CHECK RESULT = ERROR INSTRUCTION?

NO

S212
OUTPUT ESTIMATED REGISTRATION COMMAND

YES

S206
PRESENT CANCEL MESSAGE

S103
OPERATE DEVICE

S207
MONITOR OPERATION

S208
DETERMINE CORRECT COMMAND

S209
OUTPUT CORRECT COMMAND

S210
STORE CORRECT COMMAND IN DATABASE IN ASSOCIATION WITH FEATURE AMOUNT OF INPUT VOICE DATA

S211
PRESENT TERMINATION MESSAGE

END

END

Figure 16:
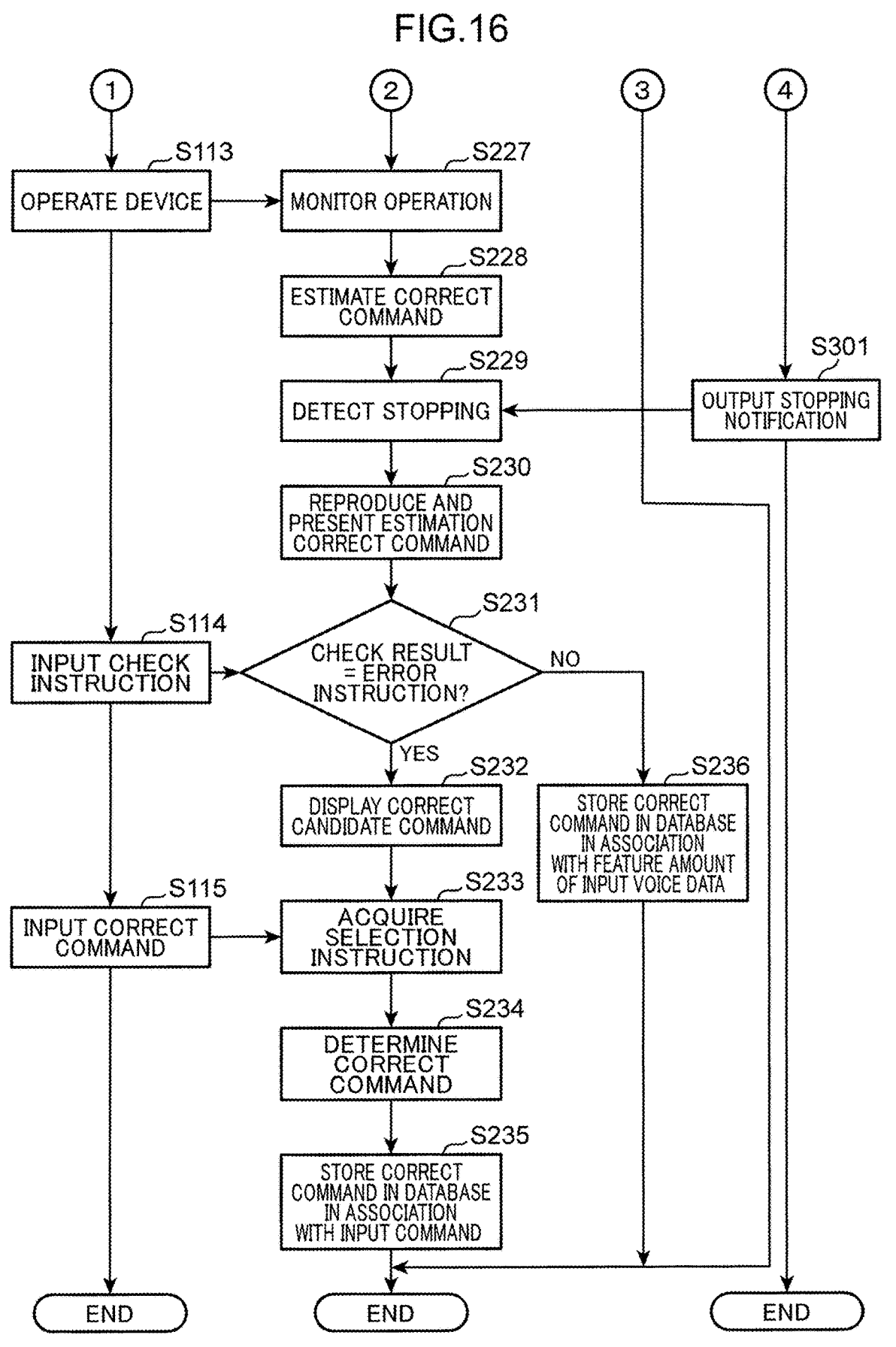

S113
OPERATE DEVICE

S227
MONITOR OPERATION

S228
ESTIMATE CORRECT COMMAND

S229
DETECT STOPPING

S301
OUTPUT STOPPING NOTIFICATION

S230
REPRODUCE AND PRESENT ESTIMATION CORRECT COMMAND

S114
INPUT CHECK INSTRUCTION

S231
CHECK RESULT = ERROR INSTRUCTION?

NO

YES

S232
DISPLAY CORRECT CANDIDATE COMMAND

S236
STORE CORRECT COMMAND IN DATABASE IN ASSOCIATION WITH FEATURE AMOUNT OF INPUT VOICE DATA

S115
INPUT CORRECT COMMAND

S233
ACQUIRE SELECTION INSTRUCTION

S234
DETERMINE CORRECT COMMAND

S235
STORE CORRECT COMMAND IN DATABASE IN ASSOCIATION WITH INPUT COMMAND

END      END      END

COMMAND ESTIMATION RESULT

INCREASE SOUND
VOLUME

IF NOT CORRECT, PRESS NG.

VOICE RECOGNITION DEVICE, VOICE RECOGNITION METHOD, AND NON-TRANSITORY COMPUTER READABLE RECORDING MEDIUM

TECHNICAL FIELD

The present disclosure relates to a technique for performing voice recognition on a command of a mobile body.

BACKGROUND ART

Patent Literature 1 discloses a voice recognition device that, in a case where a voice input by a user of a vehicle cannot be recognized, stores the voice as an unrecognized word in association with a travelling situation of the vehicle, selects a plurality of synonyms for the unrecognized word from a voice recognition dictionary based on the travelling situation of the vehicle, presents the plurality of selected synonyms to the user, and stores a synonym selected by the user from among the plurality of presented synonyms in association with the unrecognized word.

However, in Patent Literature 1, it is not considered that correct voice recognition cannot be performed due to a difference in noise sound between registration of a registration command and utterance of an input command, and thus a further improvement is required.

CITATION LIST

Patent Literature

Patent Literature 1: JP 2004-233542 A

SUMMARY OF INVENTION

The present disclosure has been made to solve such a problem, and an object of the present disclosure is to provide a technique capable of correctly specifying a correct command for an input command even in a case where a noise sound is different between registration of a registration command and utterance of an input command.

A voice recognition device according to one aspect of the present disclosure is a voice recognition device that performs voice recognition on a command of a mobile body, the voice recognition device including a first acquisition unit that acquires input voice data of an input command uttered by a speaker who gets on the mobile body, a database storing registration voice data of a plurality of registration commands uttered by the speaker in advance, an estimation unit that compares the plurality of pieces of registration voice data with the input voice data to estimate a registration command corresponding to the input command, a presentation unit that presents an estimation result, a second acquisition unit that acquires an error instruction indicating that the estimation result is an error, a determination unit that, in a case where the error instruction is acquired, determines a correct command corresponding to the input command based on an operation by the speaker, and a database management unit that stores the correct command and the input voice data in the database in association with each other.

According to the present disclosure, even in a case where a noise sound is different between registration of a registration command and utterance of an input command, a correct command for an input command can be correctly specified.

BRIEF DESCRIPTION OF DRAWINGS

FIG. 2 is a diagram illustrating an example of a data structure of a database.

FIG. 4 is a diagram illustrating an example of a scene where an input command is uttered.

FIG. 5 is a diagram illustrating an example of a check screen indicating a check message.

FIG. 11 is a flowchart illustrating an example of processing of the voice recognition device according to the second embodiment.

FIG. 14 is a block diagram illustrating an example of a configuration of a voice recognition device according to a third embodiment.

FIG. 16 is a flowchart following FIG. 15.

FIG. 17 is a diagram illustrating an example of a presentation screen of an estimation correct command.

FIG. 18 is a diagram illustrating an example of a list screen of correct candidate commands.

FIG. 19 is a diagram illustrating a presentation screen according to a modification.

FIG. 21 is a diagram illustrating an example of a check screen indicating a check message in the modification of the first embodiment.

Figure 1:
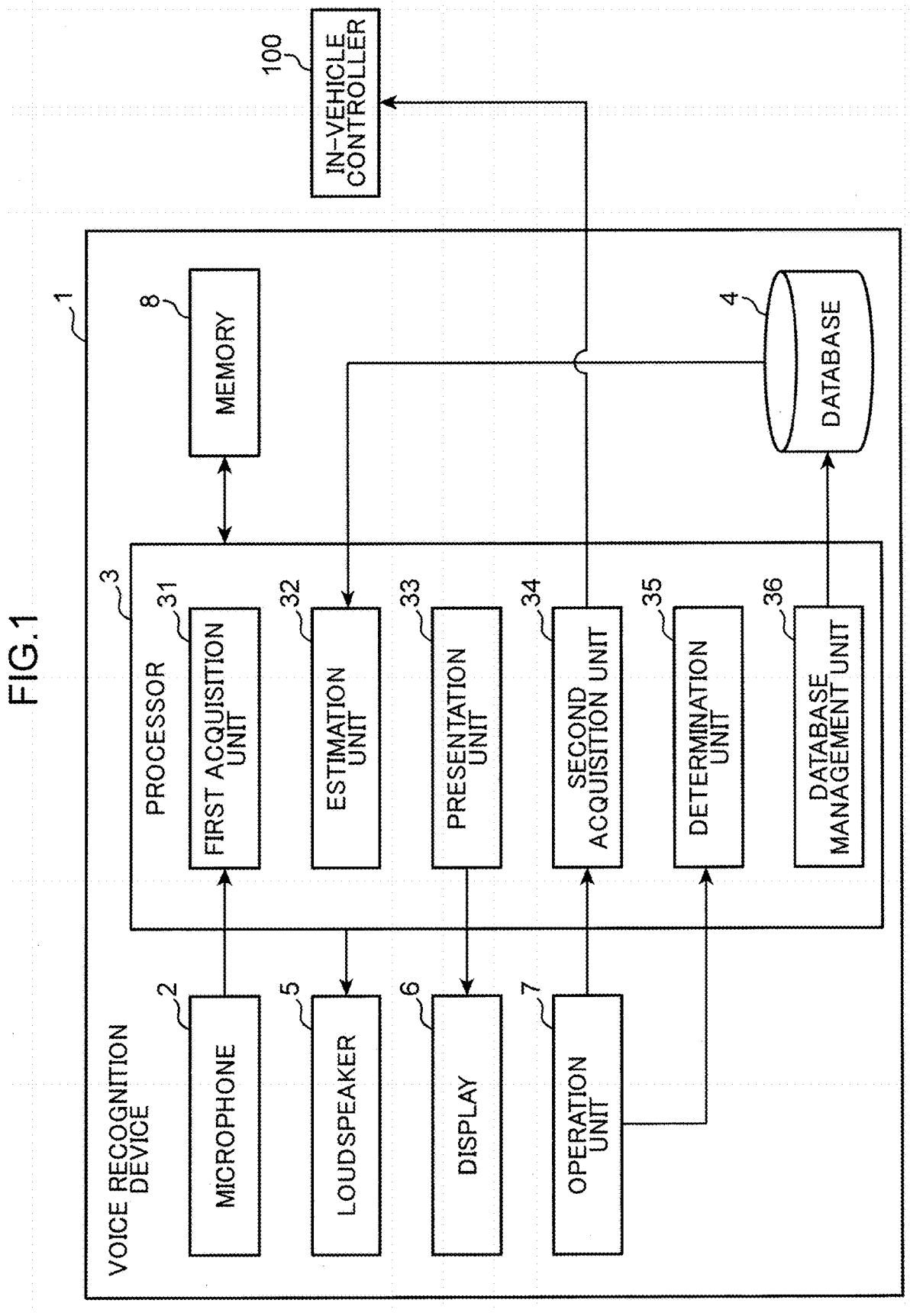
FIG. 1 is a block diagram illustrating an example of a configuration of a voice recognition device according to a first embodiment of the present disclosure.

DESCRIPTION OF EMBODIMENTS (Knowledge Underlying Present Disclosure)

There is known a speaker identification technique that acquires voice data uttered by a target speaker to be identified and compares a feature amount of the acquired voice data with a feature amount of voice data of each of a plurality of registration speakers to identify which registration speaker the target speaker corresponds to. In such a speaker identification technique, it has been found that the recognition rate is decreased when one speaker utters various contents. In particular, in a case of a short utterance such as a command for a device, it has been found that the degradation in the recognition rate becomes remarkable.

On the other hand, if this degradation in the recognition rate is used, commands for a device uttered by the same speaker can be recognized. For example, feature amounts of a plurality of registration commands uttered by the target speaker are registered in advance, a feature amount of an input command uttered by the target speaker is compared with each of the feature amounts of the plurality of registration commands, and a registration command having the maximum similarity is determined as the input command. As a result, the input command can be recognized.

However, in a device such as a mobile body, an ambient noise sound varies depending on driving conditions such as travel and stopping. Therefore, in a case where the driving situation is different between at the registration of the feature amounts of the plurality of registration commands during stopping and at the utterance of the input command during travel, only similarity of low value can be obtained, and the input commands cannot be accurately recognized.

Patent Literature 1 does not describe a difference in noise sound between the registration and the utterance as a cause of voice recognition failure, and thus has an idea different from the present disclosure. Further, Patent Literature 1 presents a plurality of synonyms for an unrecognized word to a user, but the plurality of synonyms is merely selected in accordance with a travel situation, and cannot be said to be always synonyms for the unrecognized word. Further, since Patent Literature 1 is configured to cause the user to select a synonym from among the plurality of presented synonyms, the user needs to memorize in their head synonyms different from an originally intended word. Therefore, Patent Literature 1 needs further improvement in order to store a correct synonym corresponding to an unrecognized word in association with the unrecognized word.

The present disclosure has been made in order to solve such a problem. Each aspect of the present disclosure will be described below.

A voice recognition device according to one aspect of the present disclosure is a voice recognition device that performs voice recognition on a command of a mobile body, the voice recognition device including a first acquisition unit that acquires input voice data of an input command uttered by a speaker who gets on the mobile body, a database storing registration voice data of a plurality of registration commands uttered by the speaker in advance, an estimation unit that compares the plurality of pieces of registration voice data with the input voice data to estimate a registration command corresponding to the input command, a presentation unit that presents an estimation result, a second acquisition unit that acquires an error instruction indicating that the estimation result is an error, a determination unit that, in a case where the error instruction is acquired, determines a correct command corresponding to the input command based on an operation by the speaker, and a database management unit that stores the correct command and the input voice data in the database in association with each other.

According to this configuration, in the case where the registration command corresponding to the input command is estimated and the error instruction for the estimation result is acquired, the correct command for the input command is determined based on the operation by the speaker, and the correct command and the input voice data are stored in the database in association with each other.

Therefore, even if the input command cannot be correctly recognized due to the difference in noise sound between at the registration of the registration command and at the utterance of the input command, the correct command for the input command can be correctly specified, and the specified correct command can be registered in the database in association with the input voice data. As a result, the input voice data including the noise sound at the time when the input command cannot be recognized is registered in the database in association with the correct command. Therefore, thereafter, in a case where an erroneously estimated input command is uttered in the same scene as the scene where the error instruction is input, the correct command for the input command can be correctly recognized. Further, according to the present configuration, since the input utterance data of the word (input command) originally intended to be uttered by the speaker is registered as it is, the impression of the word originally intended to be uttered remains in the speaker's head through the act of registering the input utterance data, and thereafter, a command input through the utterance becomes extremely smooth.

In the voice recognition device, the determination unit may present a plurality of correct candidate commands, acquire a selection instruction to select one correct candidate command from among the plurality of correct candidate commands, and determine the one correct candidate command as the correct command.

According to this configuration, since one correct candidate command selected from among the plurality of correct candidate commands is determined as the correct command, the correct command corresponding to the input command can be correctly recognized.

In the voice recognition device, the determination unit may present the plurality of registration commands sorted in descending order of similarity between the input voice data and the plurality of pieces of registration voice data, as the plurality of correct candidate commands.

According to this configuration, since the plurality of registration commands sorted in descending order of similarity between the input voice data and the plurality of pieces of registration voice data is presented as the plurality of correct candidate commands, selection of the correct command becomes easy.

In the above voice recognition device, after input of the error instruction, the determination unit may monitor an operation input to the mobile body and determine the correct command based on a monitoring result.

According to this configuration, since the correct command is determined based on the monitoring result of the operation input to the mobile body after the input of the error instruction, the correct command can be determined without explicitly checking with the speaker about the correct command, and a processing load and a burden on the speaker are reduced.

In the above voice recognition device, the determination unit may hold, in a memory, the input voice data corresponding to the input command to which the error instruction is input, estimate a correct command based on a monitoring result of an operation on the mobile body after the input of the error instruction, reproduce the input voice data held in the memory and present the estimated correct command in a case where stopping of the mobile body is detected, acquire a check instruction for the estimated correct command, and determine the correct command based on the check instruction.

According to this configuration, when the stopping of the mobile body is detected, the input voice data corresponding to the error instruction stored in the memory is reproduced, the correct command estimated based on the monitoring result of the operation input to the mobile body after the input of the error instruction is presented, and the correct command is determined based on the check instruction from the speaker for the estimated correct command. As a result, since the correct command check work is carried out not during travel but after stopping, the safety of the speaker during travel can be ensured. Further, since the correct command estimated in conjunction with the reproduction of the input voice data is presented, even if a plurality of input commands is erroneously estimated during travel, it is possible to prompt the speaker to easily check which input command the input voice data to be reproduced is for. In addition, since the correct command presented together with the input voice data is the correct command estimated from the monitoring result of the operation input to the mobile body, the correct command presented together with the input voice data is likely to be the correct command, and the check work to be carried out by the speaker becomes easy.

In the voice recognition device, the determination unit may present, in a case where the check instruction indicating that the estimated correct command is an error command is acquired, the plurality of registration commands as correct candidate commands, acquire a selection instruction to select one correct candidate command from among the plurality of registration commands, and determine the one correct candidate command as the correct command.

According to this configuration, even if the estimated correct command is an error command, the plurality of registration commands is presented as the correct candidate commands, and the correct command is determined by the speaker from among the presented correct candidate commands. Therefore, eventually an appropriate correct command can be determined.

In the above voice recognition device, the determination unit may present the registration commands sorted in descending order of similarity between the plurality of pieces of registration voice data and the input voice data, as the correct candidate commands.

According to this configuration, since the plurality of registration commands sorted in descending order of similarity between the input voice data and the plurality of pieces of registration voice data is presented as the plurality of correct candidate commands, selection of the correct command becomes easy.

In the above voice recognition device, the estimation unit may compare the feature amounts between the plurality of pieces of registration voice data and the input voice data to estimate the registration command corresponding to the input command.

According to this configuration, since the feature amounts of the plurality of pieces of registration voice data and the input voice data are compared, the registration command corresponding to the input command can be accurately estimated.

In the above voice recognition device, the estimation unit may compare a feature amount between the input voice data and voices of a plurality of registration speakers to identify a registration speaker corresponding to the speaker, and compare registration voice data of the plurality of registration commands with the input voice data for the identified registration speaker to estimate the registration command corresponding to the input command.

According to this configuration, the input voice data is compared with the registration voice data of the same speaker and thus the registration command corresponding to the input command is estimated. Thus, the registration command can be accurately estimated.

In the above voice recognition device, the presentation unit may present a message for prompting input of the error instruction only in a case where the estimation result is an error.

According to this configuration, the error instruction may be input only in the case where the estimation result is an error, and thus the input load can be reduced.

In the above voice recognition device, the determination unit may determine the correct command based on an operation by the speaker in a case where the second acquisition unit acquires the error instruction within a predetermined timeout period, and determine that the estimation result is correct in a case where the second acquisition unit does not acquire the error instruction within the timeout period.

According to this configuration, in a case where the error instruction is acquired within the timeout period, the processing for determining the correct command is executed, and in a case where the error instruction is not acquired within the timeout period, the estimation result is determined to be correct. Therefore, a situation in which the correctness of the estimation result is not determined for a long time is avoided.

A voice recognition method according to another aspect of the present disclosure is a voice recognition method in a voice recognition device that performs voice recognition on a command of a mobile body, the method including acquiring input voice data of an input command uttered by a speaker who gets on the mobile body, acquiring a plurality of registration commands uttered by the speaker in advance from a database, comparing each piece of the plurality of registration commands with the input voice data to estimate a registration command corresponding to the input command, presenting an estimation result, acquiring an error instruction indicating that the estimation result is an error, determining, in a case where the error instruction is acquired, a correct command corresponding to the input command based on an operation by the speaker, and storing the correct command and the input voice data in the database in association with each other.

This configuration can provide a voice recognition method that can obtain the function and effect similar to those of the voice recognition device.

A voice recognition program according to still another aspect of the present disclosure is a voice recognition program for causing a computer to function as a voice recognition device that performs voice recognition on a command of a mobile body, the program for causing the computer to perform acquiring input voice data of an input command uttered by a speaker who gets on the mobile body, acquiring registration voice data of a plurality of registration commands uttered by the speaker in advance from a database, comparing each piece of the registration voice data with the input voice data to estimate a registration command corresponding to the input command, presenting an estimation result, acquiring an error instruction indicating that the estimation result is an error, determining, in a case where the error instruction is acquired, a correct command corresponding to the input command based on an operation by the speaker, and storing the correct command and the input voice data in the database in association with each other.

This configuration can provide a voice recognition program that can obtain the function and effect similar to those of the voice recognition device.

It is needless to say that the present disclosure allows such a voice recognition program to be distributed using a computer-readable non-transitory recording medium such as a CD-ROM, or via a communication network such as the Internet.

Each of embodiments to be described below illustrates a specific example of the present disclosure. Numerical values, shapes, components, steps, an order of steps, and the like shown in the embodiments below are merely examples, and are not intended to limit the present disclosure. Furthermore, among components in the embodiments below, a component that is not described in an independent claim indicating the most significant concept will be described as an optional component. Furthermore, in all the embodiments, the respective contents can be combined.

First Embodiment

FIG. 1 is a block diagram illustrating an example of a configuration of a voice recognition device 1 according to a first embodiment of the present disclosure. The voice recognition device 1 is mounted on a mobile body, for example. Examples of the mobile body include a gasoline automobile, an electric automobile, an electric bicycle, an electric scooter, and an electric motorcycle. However, the above mobile bodies are merely examples, and the voice recognition device 1 may be a mobile information terminal possessed by a user who gets on the mobile body.

The voice recognition device 1 includes a microphone 2, a processor 3, a database 4, a loudspeaker 5, a display 6, an operation unit 7, and a memory 8.

The microphone 2 collects a sound such as a voice uttered by a user who gets on the mobile body, converts the collected sound into a sound signal, performs analog-digital (A/D) conversion on the converted sound signal, and inputs the A/D-converted sound signal to a first acquisition unit 31.

The loudspeaker 5 converts a sound signal such as a message generated by the processor 3 to a sound and outputs the converted sound to the outside.

The display 6 is a display device such as a liquid crystal display panel, and displays an image including various messages generated by a presentation unit 33.

The operation unit 7 includes a touch panel, a physical button, and the like, and receives operations input by the user. The operation unit 7 includes, for example, an operation unit that receives a user's operation on the voice recognition device 1 and an operation unit that receives an operation on the mobile body. The operation unit that receives an operation on the mobile body is, for example, an operation unit for operating devices of the mobile body. Examples of the devices of the mobile body include an audio device, an air conditioner, wipers, a car navigation device, and lighting equipment.

The memory 8 includes, for example, a rewritable non-volatile storage device, and stores a program or the like that causes the processor 3 to function as the voice recognition device 1.

The processor 3 includes, for example, a central processing unit. The processor 3 includes the first acquisition unit 31, an estimation unit 32, a presentation unit 33, a second acquisition unit 34, a determination unit 35, and a database management unit 36. The first acquisition unit 31 to the database management unit 36 are implemented by the processor 3 executing a voice recognition program. However, this is merely an example, and the first acquisition unit 31 to the database management unit 36 may be implemented by a dedicated semiconductor circuit such as an application specific integrated circuit (ASIC).

The first acquisition unit 31 detects a voice interval from a sound signal input from the microphone 2, and acquires the detected voice interval as input voice data. The input voice data includes, for example, voice data of an input command uttered by a user who rides on the mobile body. The input command is a command for controlling the mobile body. For example, the input command may be a command for setting a destination to a car navigation system, a command for switching a display screen of the car navigation system to heading-up display or north-up display, a command for operating a drive system of a mobile body such as an engine and an accelerator, or a command for operating various equipment of the mobile body such as an air conditioner, wipers, windows, and doors.

The estimation unit 32 compares a plurality of pieces of registration voice data with the input voice data to estimate a registration command corresponding to the input command. For example, the estimation unit 32 calculates similarity between each of the plurality of pieces of registration voice data that is voice data of a plurality of registration commands registered in the database 4 in advance and the input voice data, and estimates a registration command having maximum similarity equal to or greater than a threshold as the registration command corresponding to the input command. For example, the estimation unit 32 may calculate the similarity in a feature amount between each of the plurality of pieces of registration voice data and the input voice data. The feature amount is a feature amount suitable for voice recognition such as an i vector, an x vector, and a d vector. As the similarity, for example, a reciprocal of a distance between the feature amount of the registration voice data and the feature amount of the input voice data can be used. The distance is, for example, a Euclidean distance.

The presentation unit 33 presents an estimation result obtained by the estimation unit 32. For example, the presentation unit 33 presents, as the estimation result, a check message for checking whether the registration command estimated by the estimation unit 32 is correct. The estimation unit 32 may output the check message to at least one of the display 6 and the loudspeaker 5 to present the check message.

The second acquisition unit 34 acquires a check instruction from the user indicating whether the estimation result is correct via the operation unit 7. Note that the second acquisition unit 34 may acquire the check instruction through voice recognition. In this case, the second acquisition unit 34 may perform voice recognition on the input voice data collected by the microphone 2 within a predetermined period after the check message is presented to acquire the check instruction. The check instruction includes, for example, an error instruction indicating that the estimation result is an error or a correct instruction indicating that the estimation result is correct. In a case where acquiring the correct instruction, the second acquisition unit 34 may output the registration command estimated by the estimation unit 32 to an in-vehicle controller 100.

The determination unit 35 determines a correct command corresponding to an input command based on an operation by the speaker. For example, the determination unit 35 presents a plurality of correct candidate commands, acquires a selection instruction to select one correct candidate command from among the plurality of correct candidate commands, and determines the acquired one correct candidate command as the correct command. The determination unit 35 may present the plurality of registration commands sorted in descending order of the similarity between the input voice data and each of the plurality of pieces of registration voice data, as the plurality of correct candidate commands. For example, the determination unit 35 may display a list of the plurality of registration commands sorted in descending order on the display 6.

The database management unit 36 stores the correct command and the input voice data in the database 4 in association with each other.

The database 4 is implemented by, for example, a hard disk drive or a solid state drive. The database 4 stores the feature amount of the registration voice data of each of the plurality of registration commands for each of one or more speakers scheduled to ride on the mobile body. FIG. 2 is a diagram illustrating an example of a data configuration of the database 4. The database 4 stores a speaker identification (ID), a registration command ID, and the feature amount in association with each other. The speaker ID is an identifier for uniquely identifying one or more speakers who are scheduled to get on the mobile body. The registration command ID is an identifier for uniquely identifying the registration command. The feature amount is a feature amount of the registration voice data. In the example of FIG. 2, the database 4 stores feature amounts of n registration commands with registration command IDs "C1" to "Cn" for a user with user ID "U1".

The registration voice data is, for example, voice data acquired through advance registration work of causing the speaker to utter registration commands one by one. This advance registration work is carried out, for example, when the mobile body stops immediately after the purchase of the mobile body. The stopping state refers to a state in which power is supplied from a battery of the mobile body to at least the voice recognition device 1, but the mobile body is not traveling.

In the advance registration work, the database management unit 36 outputs a message prompting utterance to the display 6 and the loudspeaker 5 in a predetermined order for each of the plurality of registration commands as recognition candidates. The speaker utters the registration commands one by one in accordance with this message. The database management unit 36 prompts the speaker to input the speaker ID prior to the start of the advance registration work.

Thus, the database management unit 36 can acquire which speaker has uttered and which registration command has been currently uttered by the speaker. Then, the database management unit 36 acquires the registration voice data using the microphone 2, calculates a feature amount of the acquired registration voice data, and stores the calculated feature amount in the database 4 in association with the user ID and the registration command ID.

Figure 3:
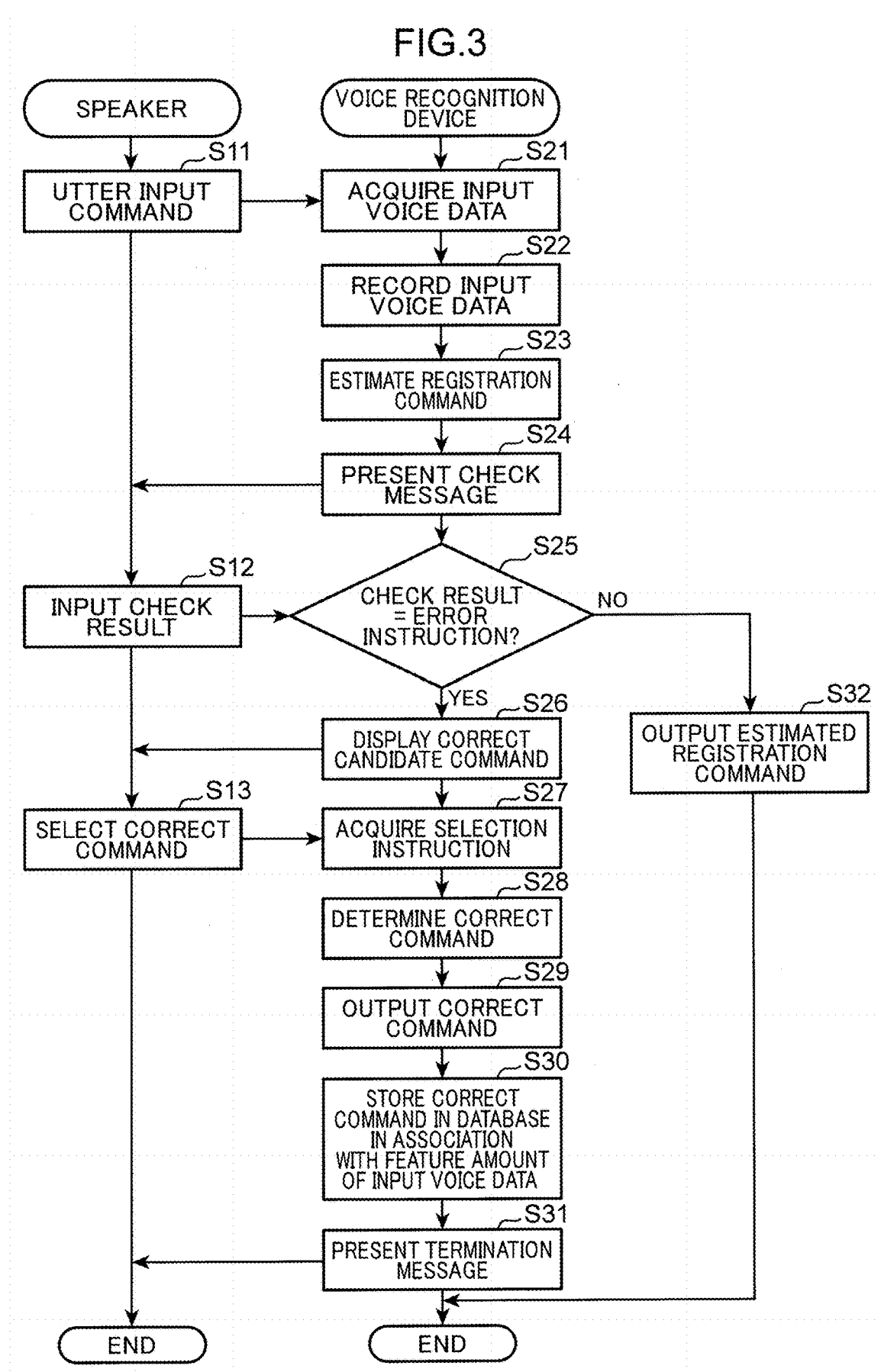
FIG. 3 is a flowchart illustrating an example of processing of the voice recognition device according to the first embodiment.
Figures 4, 5:
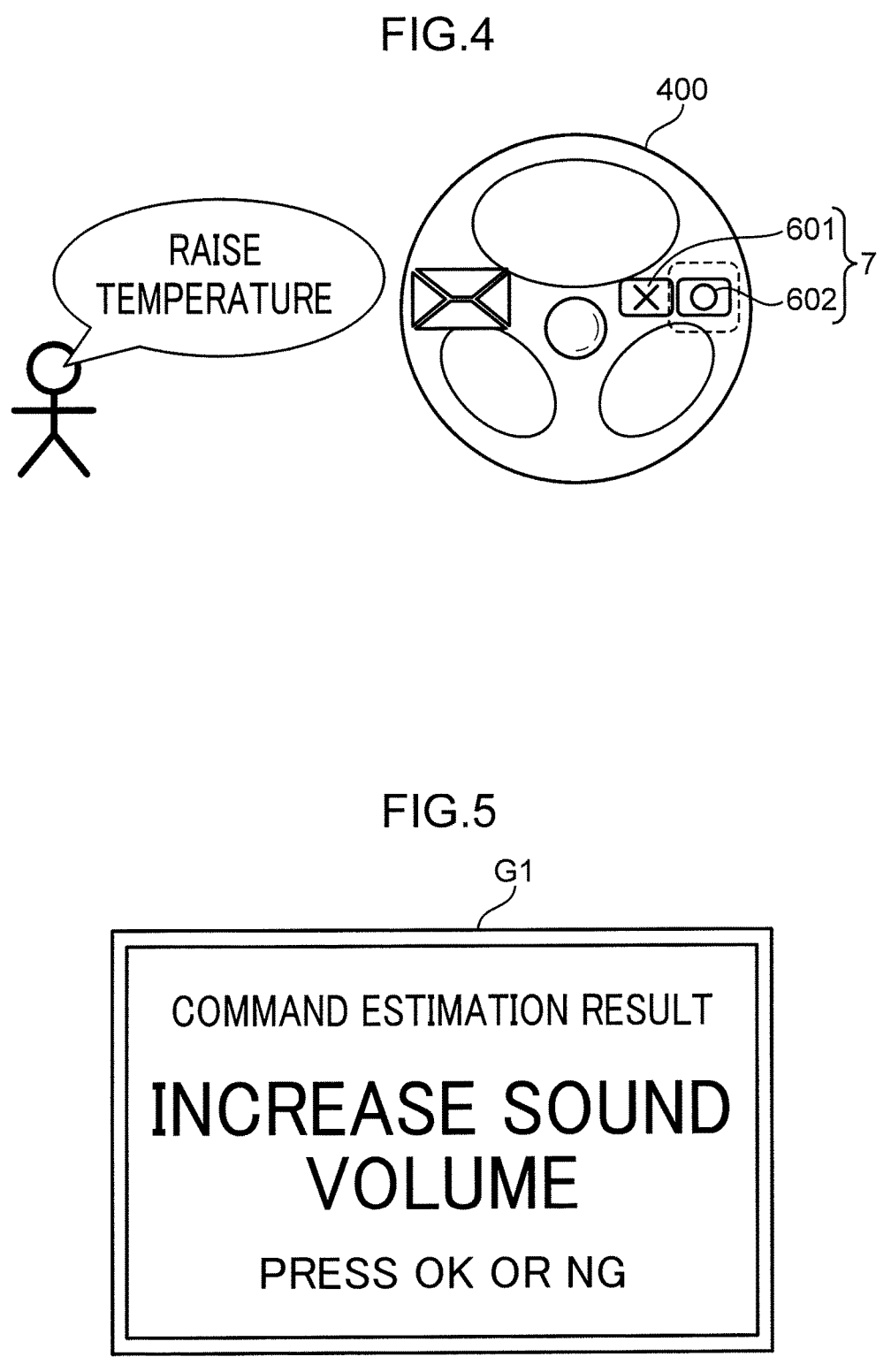

FIG. 3 is a flowchart illustrating an example of processing of the voice recognition device 1 according to the first embodiment. In step S11, the speaker (user) utters an input command. In step S12, the first acquisition unit 31 acquires an input voice data of the input command from a sound signal collected by the microphone 2. FIG. 4 is a diagram illustrating an example of a scene where the input command is uttered. In the example of FIG. 4, the speaker operating a steering wheel 400 is uttering "raise the temperature" as the input command. The steering wheel 400 includes an error button 601 for inputting an error instruction and a determination button 602 for inputting a correct instruction. The error button 601 and the determination button 602 are examples of the operation unit 7.

In step S22, the first acquisition unit 31 holds the input voice data in the memory 8 to record the input voice data. In the example of FIG. 4, the input voice data of "raise the temperature" is recorded.

In step S23, the estimation unit 32 identifies a speaker who has uttered the input command based on the feature amount of the input voice data, calculates similarity in feature amount between each of the plurality of registration commands stored in the database 4 and the input voice data for the identified speaker, and estimates a registration command having the highest similarity equal to or greater than the threshold as the registration command corresponding to the input command. When the speaker is identified, the estimation unit 32 may calculate similarity between the feature amount of a voice of each of one or more registration speakers scheduled to ride on the mobile body, the feature amount being stored in the memory 8 of the mobile body in advance and the feature amount of the input voice data, and identify a registration speaker having the calculated highest similarity as the speaker who has uttered the input command.

In step S24, the presentation unit 33 presents a check message to the speaker. FIG. 5 is a diagram illustrating an example of a check screen G1 showing the check message. In the example of FIG. 5, since the estimation result for the input command is "increase sound volume", the check screen G1 shows "increase sound volume" which is the estimation result. In addition, the check screen G1 shows a message "command estimation result" indicating that "increase sound volume" is the estimation result of the input command and a message "please press OK or NG" for prompting the speaker to input a check instruction as to whether the estimation result is correct.

Figure 6:
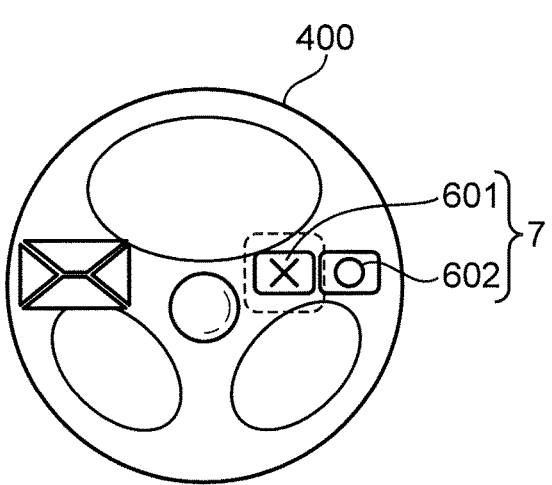
FIG. 6 is a diagram illustrating an example of a scene where an error button is operated.

In step S12, the speaker inputs the check result using the operation unit 7. FIG. 6 is a diagram illustrating an example of a scene where the error button 601 is operated. In the example of FIG. 6, although the speaker utters "raise the temperature", this utterance is estimated as "increase sound volume". Thus, the speaker presses the error button 601. In a case where the estimation result of the estimation unit 32 is correct, the speaker presses the determination button 602.

In step S25, the second acquisition unit 34 determines whether the input check instruction is an error instruction or a correct instruction. Here, since the speaker presses the error button 601, the second acquisition unit 34 determines that the check instruction is an error instruction (YES in step S25). On the other hand, in a case where the speaker presses the determination button 602, the second acquisition unit 34 determines that the check instruction is a correct instruction (NO in step S25), and outputs the registration command estimated by the estimation unit 32 to the in-vehicle controller 100 (step S32). As a result, the registration command is received by the in-vehicle controller 100.

Figure 7:
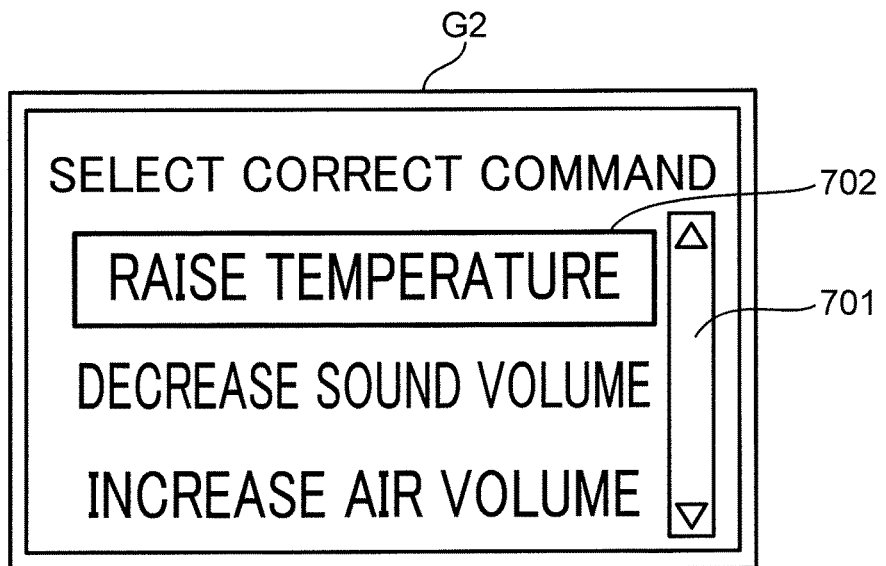
FIG. 7 is a diagram illustrating an example of a list screen of correct candidate commands.

In step S26, the determination unit 35 displays the plurality of registration commands stored in the database 4 on the display 6 as the correct candidate commands. In this case, the determination unit 35 may sort the registration commands in descending order of the similarity of the registration voice data with respect to the input voice data and display the sorted registration commands on the display 6. FIG. 7 is a diagram illustrating an example of a list screen G2 of the correct candidate commands. In this example, the similarity of the registration commands with respect to the input voice data is high in the order of "raise temperature", "decrease sound volume", and "increase air volume", and thus the list screen G2 shows the registration commands in this order. Note that, when displaying the correct candidate command, the determination unit 35 may exclude a registration command erroneously estimated by the estimation unit 32.

In step S13, the speaker selects a correct command from the registration commands shown on the list screen G2. In the example of FIG. 7, the speaker inputs an operation for positioning a quadrangular cursor 702 on the correct command, and presses the determination button 602 to select the correct command.

Figures 8, 9:
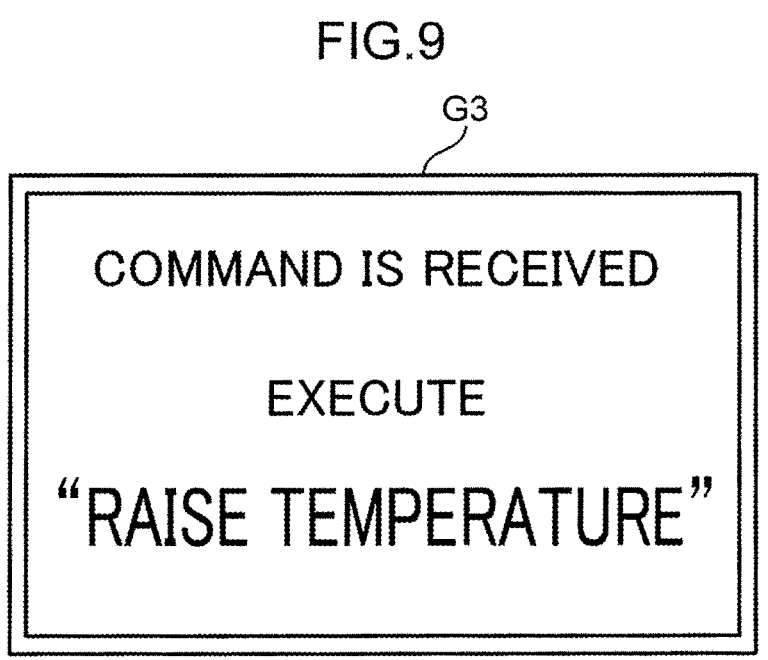
FIG. 8 is a diagram illustrating an example of a scene where the correct command is selected.
FIG. 9 is a diagram illustrating an example of a completion screen indicating a completion message.

FIG. 8 is a view illustrating an example of a scene where the correct command is selected. As illustrated in FIG. 8, the operation for positioning the cursor 702 can be performed by operating an up button 603 or a down button 604 provided on the steering wheel 400. The up button 603 is a button for moving the cursor 702 up, and the down button 604 is a button for moving the cursor 702 down. The up button 603 and the down button 604 are examples of the operation unit 7.

When the down button 604 is pressed in a state where the cursor 702 is positioned at the bottom or second registration command from the bottom on the list screen G2 illustrated in FIG. 7, the plurality of registration commands to be shown is scrolled on the list screen G2, and registration commands having the lower similarity with respect to the input voice data are shown. In a case where an operation on the scroll bar 701 is input, the plurality of registration commands to be displayed may be scrolled on the list screen G2.

The speaker may input an operation for touching the registration command corresponding to the correct command among the registration commands shown on the list screen G2 to select the correct command. Here, the registration command "raise the temperature" is selected.

In step S27, the determination unit 35 acquires a selection instruction indicating the selected registration command via the operation unit 7. In step S28, the determination unit 35 determines the registration command indicated by the correct instruction as the correct command.

In step S29, the determination unit 35 outputs the correct command to the in-vehicle controller 100. As a result, the in-vehicle controller 100 acquires the correct command and executes the acquired correct command. Here, the correct command "raise the temperature" is executed. As a result, the in-vehicle controller 100 performs control for raising the temperature of the air conditioner included in the mobile body.

In step S30, the database management unit 36 stores the correct command in the database 4 in association with the speaker ID of the speaker identified in step S23 and the feature amount of the input voice data acquired in step S21. As a result, a record in which the feature amount of the input voice data, the registration command ID of the registration command corresponding to the correct command, and the speaker ID are associated with each other is added to the database 4. Here, the feature amount of the input voice data to be added is a feature amount including a noise sound which is an environmental sound at a time of inputting an error instruction. Therefore, thereafter, in a case where an erroneously estimated input command is uttered in a scene similar to the scene where the error instruction is input, the estimation unit 32 can compare the feature amounts of the input voice data and the registration voice data whose noise sounds are similar, and the estimation accuracy of the registration command is improved.

In step S31, the determination unit 35 presents a termination message indicating that the correct command has been received to the user using at least one of the microphone 2 and the loudspeaker 5. FIG. 9 is a diagram illustrating an example of a termination screen G3 indicating a termination message. The termination screen G3 shows "command has been accepted" which is a message indicating that the input command has been received. In addition, the termination screen G3 shows a message "execute" the received command "raise the temperature".

As described above, in the voice recognition device 1, in the case where the registration command corresponding to the input command is estimated and the error instruction for the estimation result is acquired, the correct command for the input command is determined based on the operation by the speaker, and the correct command and the input voice data are stored in the database 4 in association with each other.

Therefore, even if the input command uttered by the same speaker cannot be correctly recognized due to the difference between the noise sound during registration of the registration command and the noise sound during utterance of the input command, the correct command for the input command can be correctly specified, and the specified correct command can be registered in the database 4 in association with the input voice data and the speaker ID. As a result, the input voice data including the noise sound at the time when the input command cannot be recognized is registered in the database 4 in association with the correct command and the speaker ID. Therefore, thereafter, in a case where an erroneously estimated input command is uttered by the same speaker in the same scene as the scene where the error instruction is input, the correct command for the input command can be correctly recognized.

Second Embodiment

Figure 10:
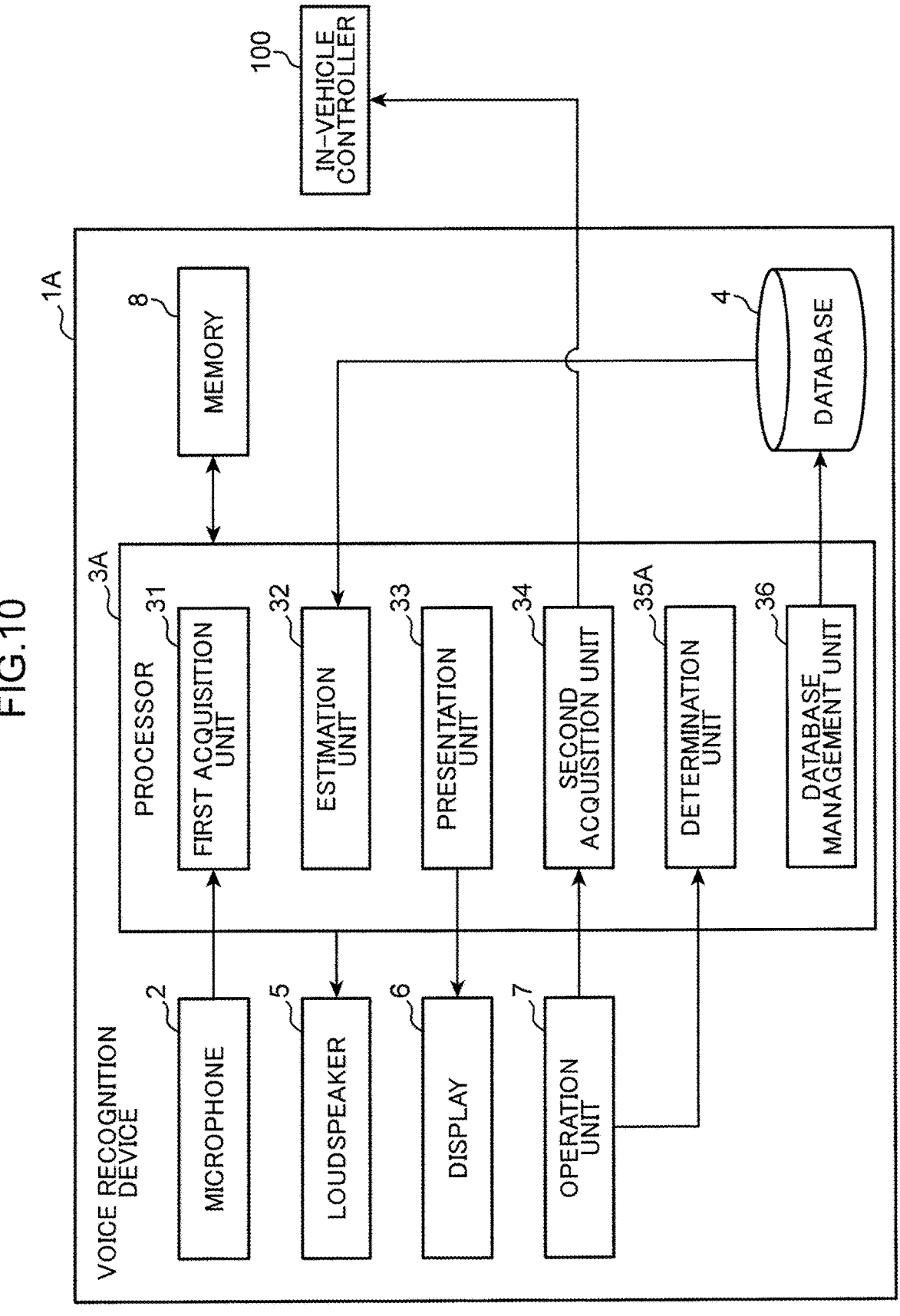
FIG. 10 is a block diagram illustrating an example of a configuration of a voice recognition device according to a second embodiment.

In a second embodiment, a correct command is determined based on a monitoring result of an operation input to a mobile body. FIG. 10 is a block diagram illustrating an example of the configuration of a voice recognition device 1A in the second embodiment. Note that in the second embodiment, the same components as those in the first embodiment are denoted by the same reference signs, and the description thereof will be omitted.

A processor 3A of the voice recognition device 1A includes a first acquisition unit 31, an estimation unit 32, a presentation unit 33, a second acquisition unit 34, a determination unit 35A, and a database management unit 36. After the second acquisition unit 34 acquires an error instruction, the determination unit 35A monitors an operation input to the operation unit 7 and determines a correct command based on a monitoring result. Here, after the second acquisition unit 34 acquires the error instruction, the determination unit 35A may determine a registration command input first among a plurality of registration commands as the correct command. For example, the determination unit 35A may set, as a monitoring period, a certain period after the error instruction is acquired, and determine, as the correct command, the registration command input first among the plurality of input registration commands in the monitoring period. The monitoring period is an assumed period from the input of the error instruction to the input of the operation corresponding to the uttered input command, and for example, an appropriate time such as 1 minute or 2 minutes can be set.

FIG. 11 is a flowchart illustrating an example of processing of the voice recognition device 1A according to the second embodiment. In FIG. 11, steps S101 and S102 are the same as steps S11 and S12 in FIG. 3. In FIG. 11, steps S201, S202, S203, S204, S205, and S212 are the same as steps S21, S22, S23, S24, S25, and S32 in FIG. 3. Further, in FIG. 11, as in the first embodiment, a case where utterance "raise the temperature" is estimated as "increase sound volume" is exemplified. Therefore, in step S204, the check screen G1 illustrated in FIG. 5 is displayed.

Figure 12:
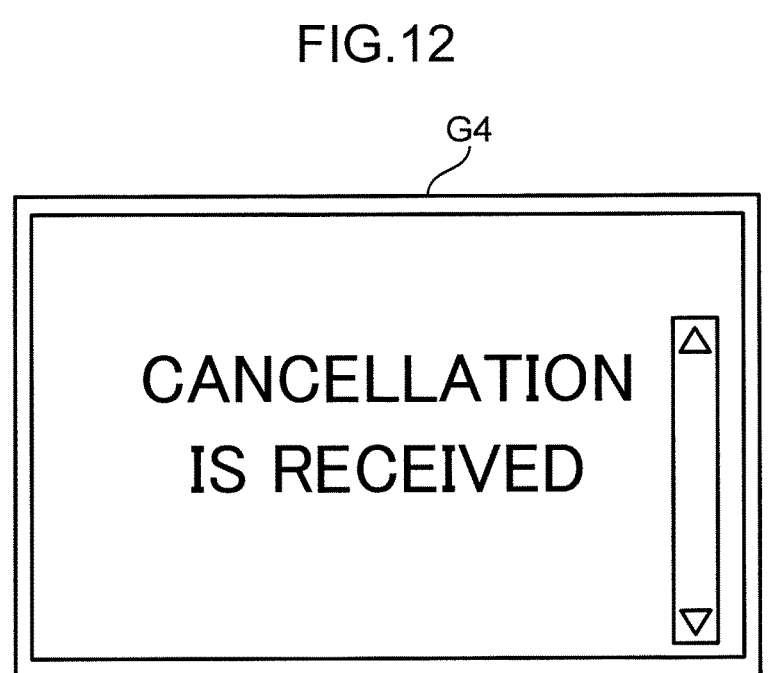
FIG. 12 is a diagram illustrating a cancel screen presenting a cancel message.

In step S206, the second acquisition unit 34 that has acquired the error instruction presents a cancel message indicating that the input command has been canceled to the speaker using at least one of a microphone 2 and a loudspeaker 5. FIG. 12 is a diagram illustrating a cancel screen G4 presenting the cancel message. The cancel screen G4 shows a message "cancellation has been accepted" indicating that the input command has been cancelled.

In step S103, the speaker inputs an operation of the device to the operation unit 7.

In step S207, the determination unit 35A monitors the operation of the device input to the operation unit 7. In step S208, the determination unit 35A determines a correct command based on the monitoring result.

Figure 13:
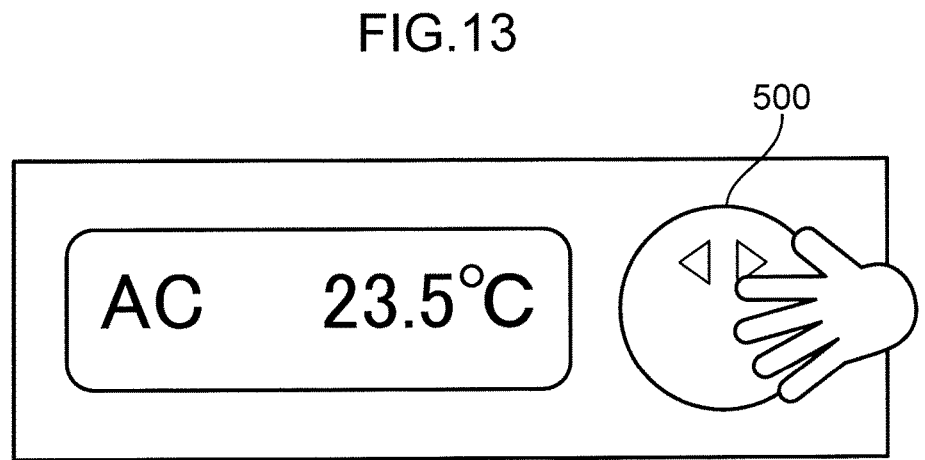
FIG. 13 is a diagram illustrating an example of a monitoring scene.

FIG. 13 is a diagram illustrating an example of a monitoring scene. In the example of FIG. 13, a dial 500 for adjusting the temperature of an air conditioner is adjusted clockwise, and the operation for raising the temperature of the air conditioner is input. This operation is the operation first input during the monitoring period. Therefore, the determination unit 35A determines that the input command is "raise the temperature" for the air conditioner. Note that, in the monitoring period, the determination unit 35A may determine, just when the registration command is first input, the registration command as the correct command, or may wait for the termination of the monitoring period, then specify the registration command input first during the monitoring period, and determine the specified registration command as the correct command. Note that, in a case where a registration command is not input during the monitoring period, the determination unit 35 A may terminate the processing without determining the correct command.

Steps S209, S210, and S211 are the same as steps S29, S30, and S31 in FIG. 3, a correct command is output to the in-vehicle controller 100, the correct command is stored in the database 4 in association with the feature amount of the input voice data and the speaker ID, and a termination message is presented.

As described above, in the voice recognition device 1A, since the correct command is determined based on the monitoring result of the operation input to the mobile body after the input of the error instruction, the correct command can be determined without explicitly checking with the speaker about the correct command, and a processing load and a burden on the speaker are reduced.

Third Embodiment

Figure 14:
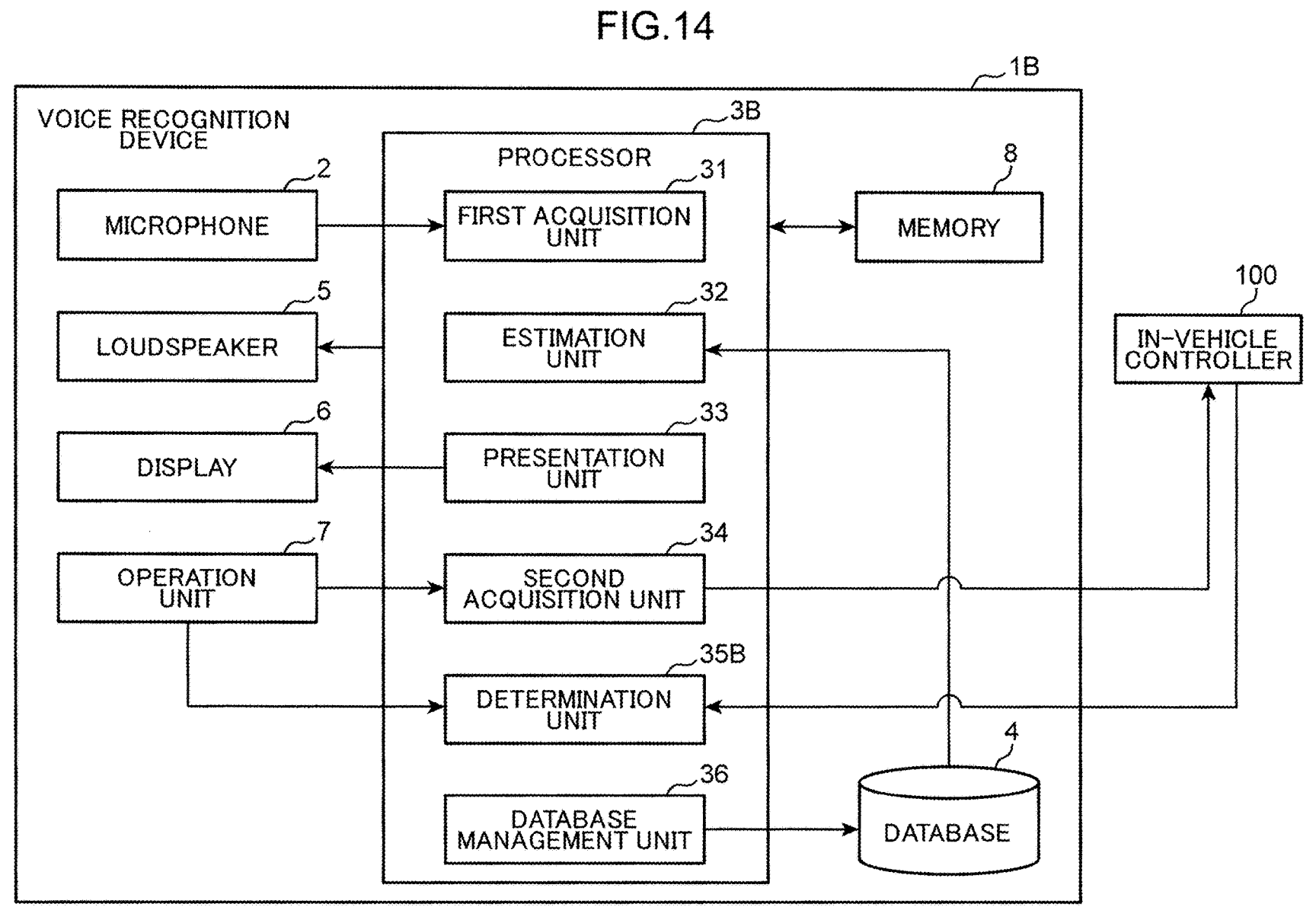

In a third embodiment, a speaker is prompted to carry out check work of a correct command after a mobile body stops. FIG. 14 is a block diagram illustrating an example of a configuration of a voice recognition device 1B according to the third embodiment. In the third embodiment, the same components as those in the first and second embodiments are denoted by the same reference signs, and the description thereof will be omitted.

A processor 3B of the voice recognition device 1B includes a first acquisition unit 31, an estimation unit 32, a presentation unit 33, a second acquisition unit 34, a determination unit 35B, and a database management unit 36.

The determination unit 35B holds, in the memory 8, input voice data corresponds to an input command into which an error instruction has been input. After inputting the error instruction, the determination unit 35B estimates a correct command based on a monitoring result of an operation on the mobile body. Details of processing for estimating the correct command based on the monitoring result are the same as the processing for determining the correct command based on the monitoring result in the second embodiment.

When detecting the stopping of the mobile body, the determination unit 35B reproduces the input voice data held in the memory 8 and presents the estimated correct command, acquires a check instruction for the estimated correct command, and determines the correct command based on the check instruction. For example, in a case where the determination unit 35B acquires, from an in-vehicle controller 100, a stopping notification notifying that the mobile body is stopped, the determination unit 35B may detect that the mobile body is stopped. The stopping notification may be notified, for example, when an ignition key of the mobile body is turned off, or may be notified when a shift lever of the mobile body is set to parking or neutral. Furthermore, the determination unit 35B may recognize a state that the mobile body stays at a predetermined place in a certain period of time as stopping using position information from a Global Positioning System (GPS). Note that, in a case where the stopping of the mobile body is detected, the determination unit 35B may reproduce the input voice data held in the memory 8, and present the correct command to a personal digital assistant (for example, a smartphone) of a user who gets on the mobile body.

Figure 15:
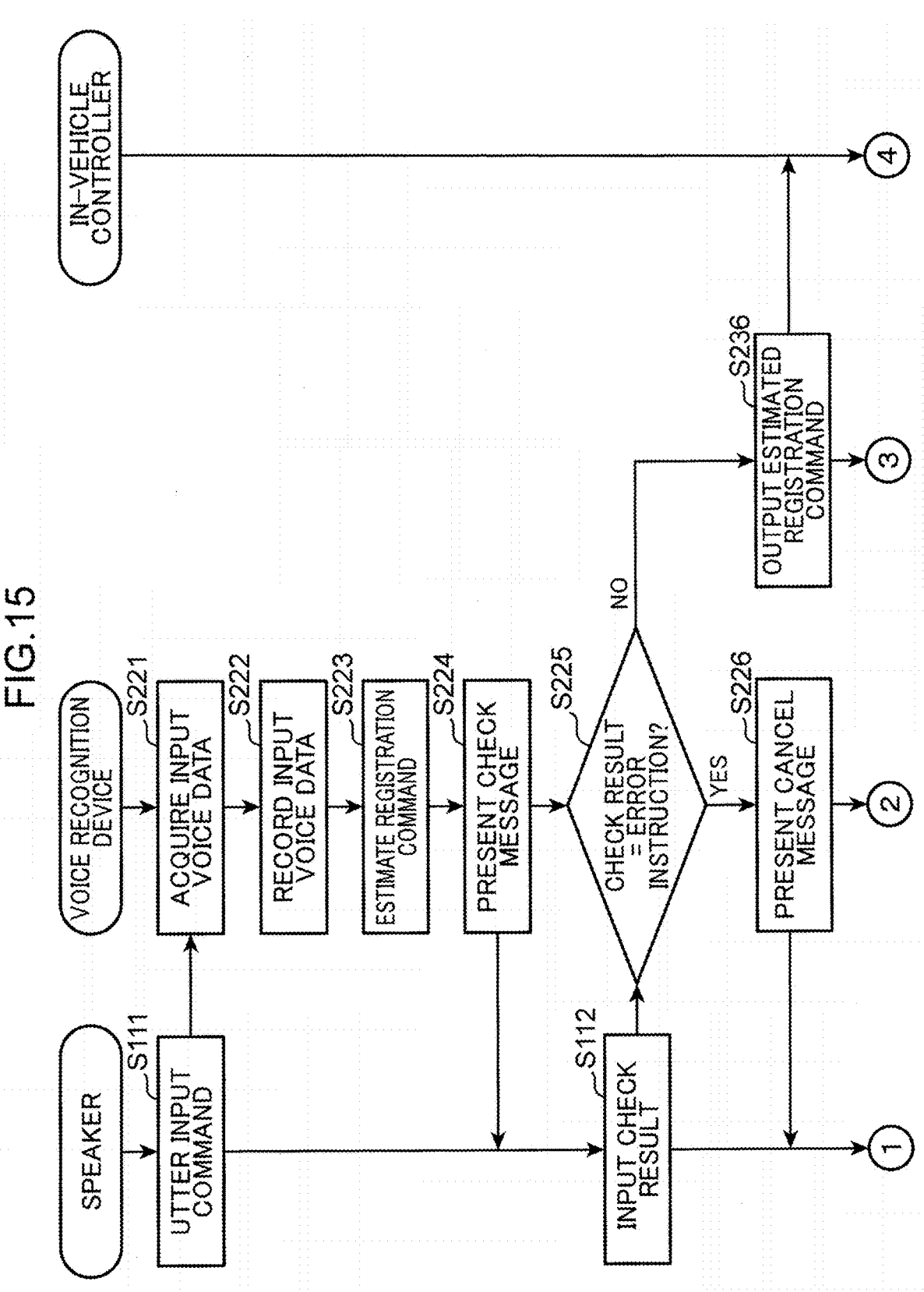
FIG. 15 is a flowchart illustrating an example of processing of the voice recognition device 1B according to the third embodiment.

FIG. 15 is a flowchart illustrating an example of processing of the voice recognition device 1B according to the third embodiment. In FIG. 15, steps S111 and S112 are the same as steps S101 and S103 in FIG. 11. In FIG. 15, steps S221, S222, S223, S224, S225, S226, and S236 are the same as steps S201, S202, S203, S204, S205, S206, and S212 in FIG. 11. Further, in FIG. 15, as in the second embodiment, a case where utterance "raise the temperature" is estimated as "increase sound volume" is exemplified. Therefore, the check screen G1 illustrated in FIG. 5 is displayed in step S224, and the cancel screen G4 illustrated in FIG. 12 is displayed in step S226.

FIG. 16 is a flowchart following FIG. 15. In FIG. 16, step S113 is the same as step S102 in FIG. 11. In FIG. 16, step S227 is the same as step S207 in FIG. 11.

In step S228, the determination unit 35B estimates the correct command based on the monitoring result of the operation of the device input to the operation unit 7. In step S301, the in-vehicle controller 100 outputs the stopping notification. Hereinafter, the estimated correct command is referred to as an estimation correct command.

In step S229, the determination unit 35B acquires the stopping notification to detect the stopping of the mobile body. In step S230, the determination unit 35B reproduces the input voice data recorded in step S222 and presents the estimation correct command.

Figure 17:
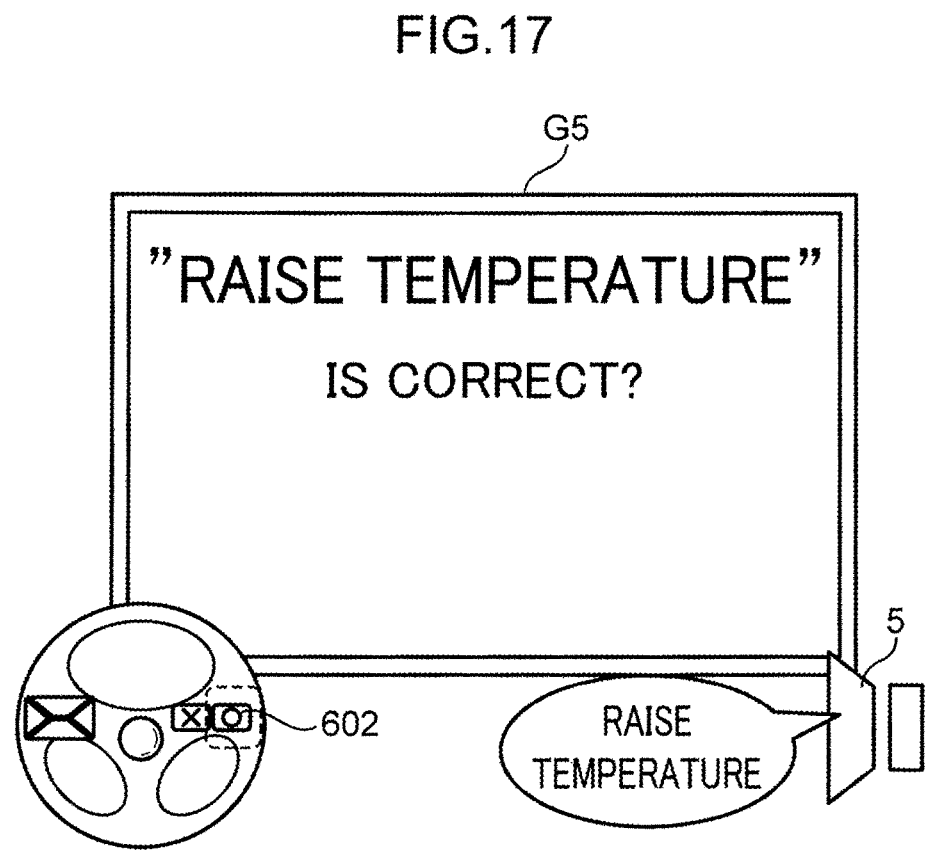

FIG. 17 is a diagram illustrating an example of a presentation screen G5 of the estimation correct command. The presentation screen G5 shows "raise the temperature" indicating the estimation correct command and a message "is this correct?" inquiring whether the presented estimation correct command is correct. The determination unit 35B outputs the recorded input voice data from the loudspeaker 5 in a state where the presentation screen G5 is displayed. The speaker collates the output sound of the input voice data "raise the temperature" with the estimation correct command shown on the presentation screen G5 to determine whether the estimation correct command is correct.

In step S114, the speaker who has checked the presentation screen G5 inputs a check instruction indicating whether the estimation correct command is correct. The speaker who has determined that the command is correct presses a determination button 602. As a result, the determination unit 35B acquires a correct instruction as the check instruction (NO in step S231), determines the estimation correct command as the correct command, and stores the determined correct command in the database 4 in association with the feature amount of the input voice data and the speaker ID (step S236).

On the other hand, the speaker who has determined that the command is an error presses an error button 601. Accordingly, the determination unit 35B acquires an error instruction as the check instruction (YES in step S231), and the processing goes to step S232.

Figure 18:
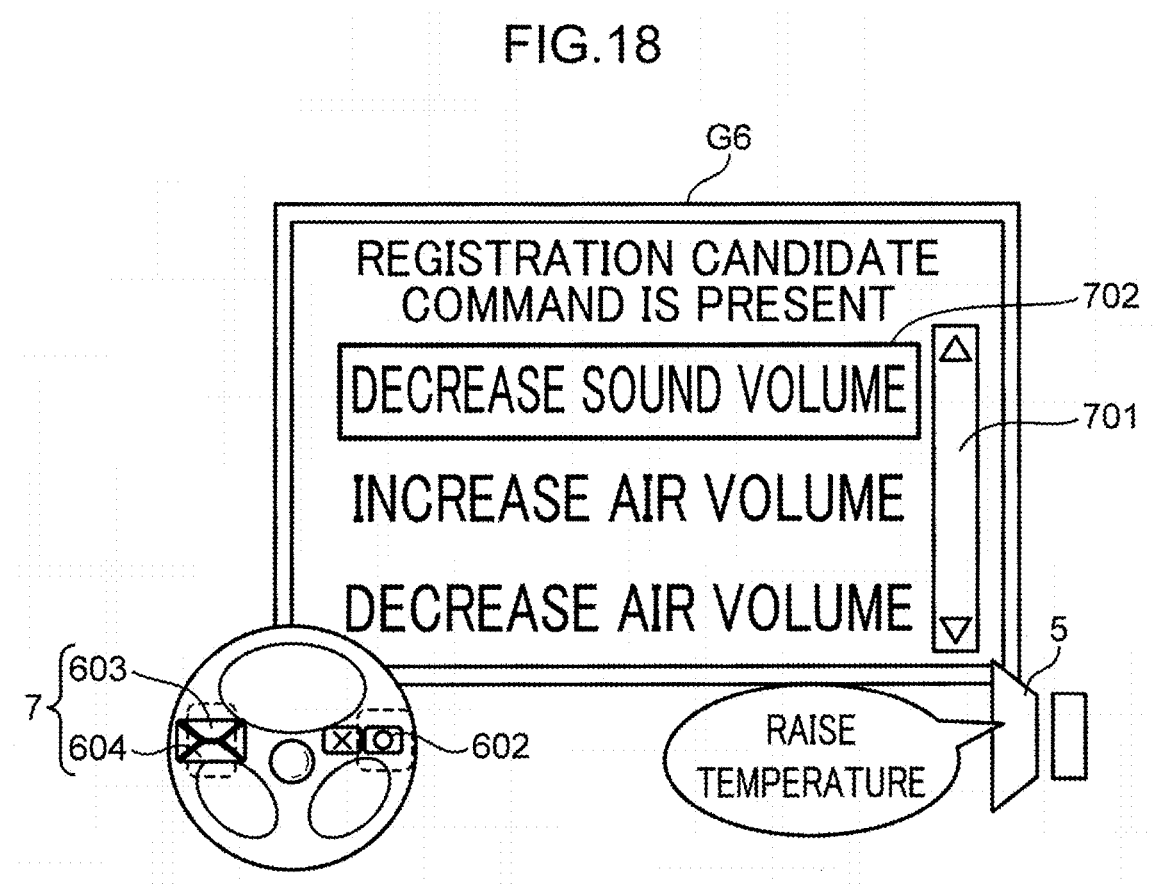

In step S232, the determination unit 35B displays a plurality of registration commands stored in the database 4 on the display 6 as correct candidate commands. FIG. 18 is a diagram illustrating an example of a list screen G6 of the correct candidate commands. In this example, the similarity of the registration commands with respect to the input voice data is high in the order of "decrease sound volume", "increase air volume", and "decrease air volume", and thus the list screen G6 shows the registration commands in this order. Note that, when the correct candidate command is displayed, the determination unit 35B may exclude a registration command and an estimation correct command erroneously estimated by the estimation unit 32. Since the basic configuration of the list screen G6 is the same as that of the list screen G2 illustrated in FIG. 7, detailed description will be omitted.

In step S115, the speaker selects a correct command from among the registration commands shown on the list screen G6. In the example of FIG. 18, the speaker operates an up button 603 or a down button 604 to position a cursor 702 on a corresponding registration command, and presses the determination button 602 to select the correct command. The determination unit 35B may output the input audio data "raise the temperature" from the loudspeaker 5 again in the state where the list screen G6 is displayed.

In step S233, the determination unit 35B acquires a selection instruction indicating the selected registration command via the operation unit 7. In step S234, the determination unit 35B determines the registration command indicated by the correct instruction as the correct command.

In step S235, the database management unit 36 stores the correct command in the database 4 in association with the feature amount of the input voice data and the speaker ID.

In such a manner, in the voice recognition device 1B, when the stopping of the mobile body is detected, the input voice data corresponding to the error instruction stored in the memory 8 is reproduced, and the estimation correct command estimated based on the monitoring result of the operation input to the mobile body after the input of the error instruction is presented. Then, the correct command is determined based on the check instruction from the speaker for the estimation correct command. As a result, since the correct command check work is carried out not during travel but after stopping, the safety of the speaker during travel can be ensured.

Note that a plurality of error instructions may be input during travel. In this case, the first acquisition unit 31 may simply hold the plurality of pieces of input voice data to which the error instruction has been input in the memory 8 during travel. The determination unit 35B estimates the estimation correct command during travel based on the monitoring result of the operation on the device for each of the plurality of pieces of input voice data. Then, after the mobile body stops, the determination unit 35B presents the estimation correct command for each of the plurality of pieces of input voice data in conjunction with reproduction of the input voice data, and prompts the speaker to sequentially carry out the check work of the correct command, thereby determining the correct command corresponding to the plurality of pieces of input voice data. In this case, the database management unit 36 may store the feature amount in the database 4 in association with the determined correct command and the speaker ID for each of the plurality of pieces of input voice data.

In such a manner, since the estimation correct command is presented in conjunction with the reproduction of the input voice data, even if a plurality of error instructions is input during travel, the speaker can easily check which input command the input voice data to be reproduced correspond to.

In addition, since the estimation correct command presented together with the input voice data is the correct command estimated based on the monitoring result of the operation input to the mobile body, the correct command presented together with the input voice data is likely to be the correct command, and the check work to be carried out by the speaker becomes easy.

Modifications set forth below can be adopted in the present disclosure.

Figure 19:
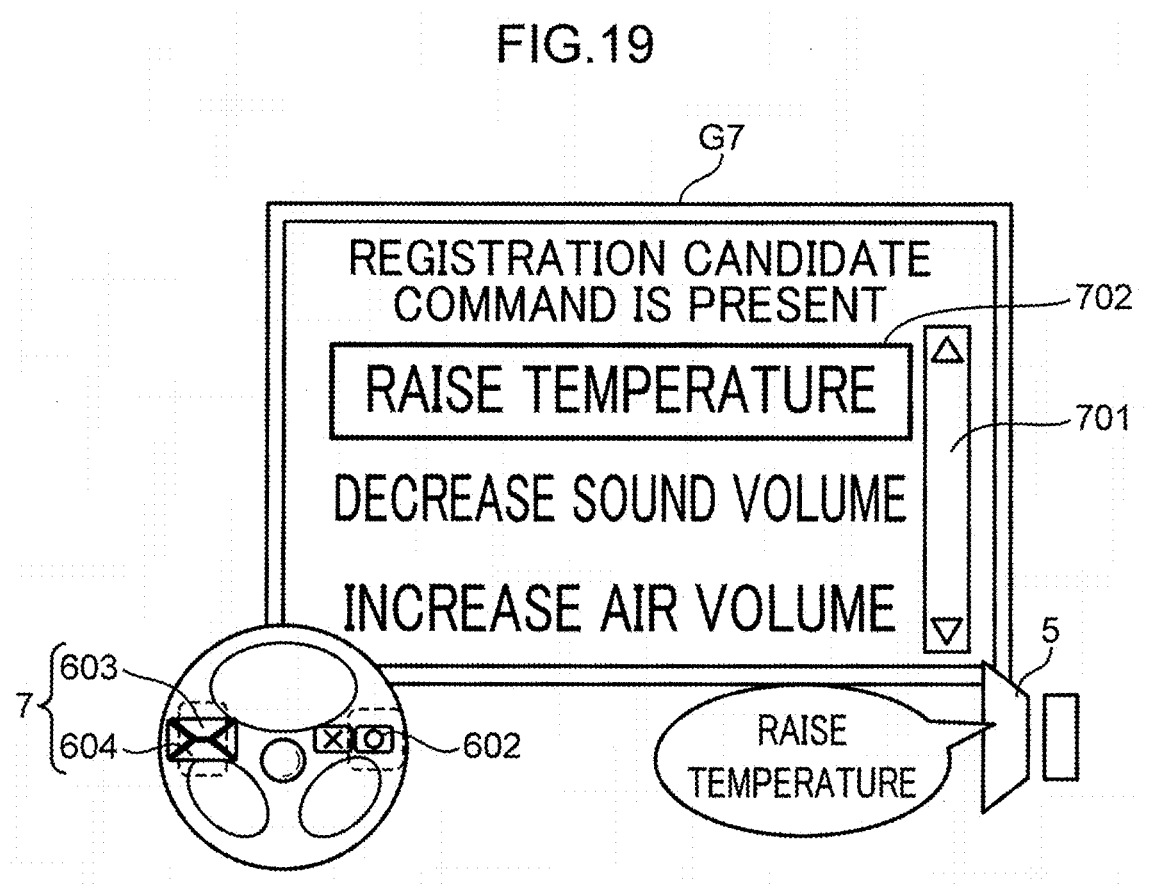

(1) In step S230 of FIG. 16, the determination unit 35B may display a presentation screen G7 illustrated in FIG. 19 on the display 6. FIG. 19 is a diagram illustrating the presentation screen G7 according to a modification. The presentation screen G7 shows the estimation correct command at the top and shows registration commands that are sorted in descending order of the similarity with respect to the input voice data at the second and subsequent parts and are other than the registration commands erroneously estimated by the estimation unit 32.

The determination unit 35B outputs the input voice data "raise the temperature" from the loudspeaker 5 in conjunction with display of the presentation screen G5. The speaker who hears this sound operates the up button 603 or the down button 604 to position the cursor 702 on an intended registration command, and presses the determination button 602. The registration command selected in this manner is determined as the correct command for the input voice data, and is stored in the database 4 in association with the feature amount of the input voice data. In this modification, the speaker does not need to input the check instruction in step S114, and does not need to display the list screen G6 in step S232. Therefore, the processing can be simplified.

(2) Some components included in the processor 3 and the database 4 in the first embodiment may be held by a cloud server.

(3) The database stores the feature amount of the registration voice data, but may store the registration voice data.

Figure 20:
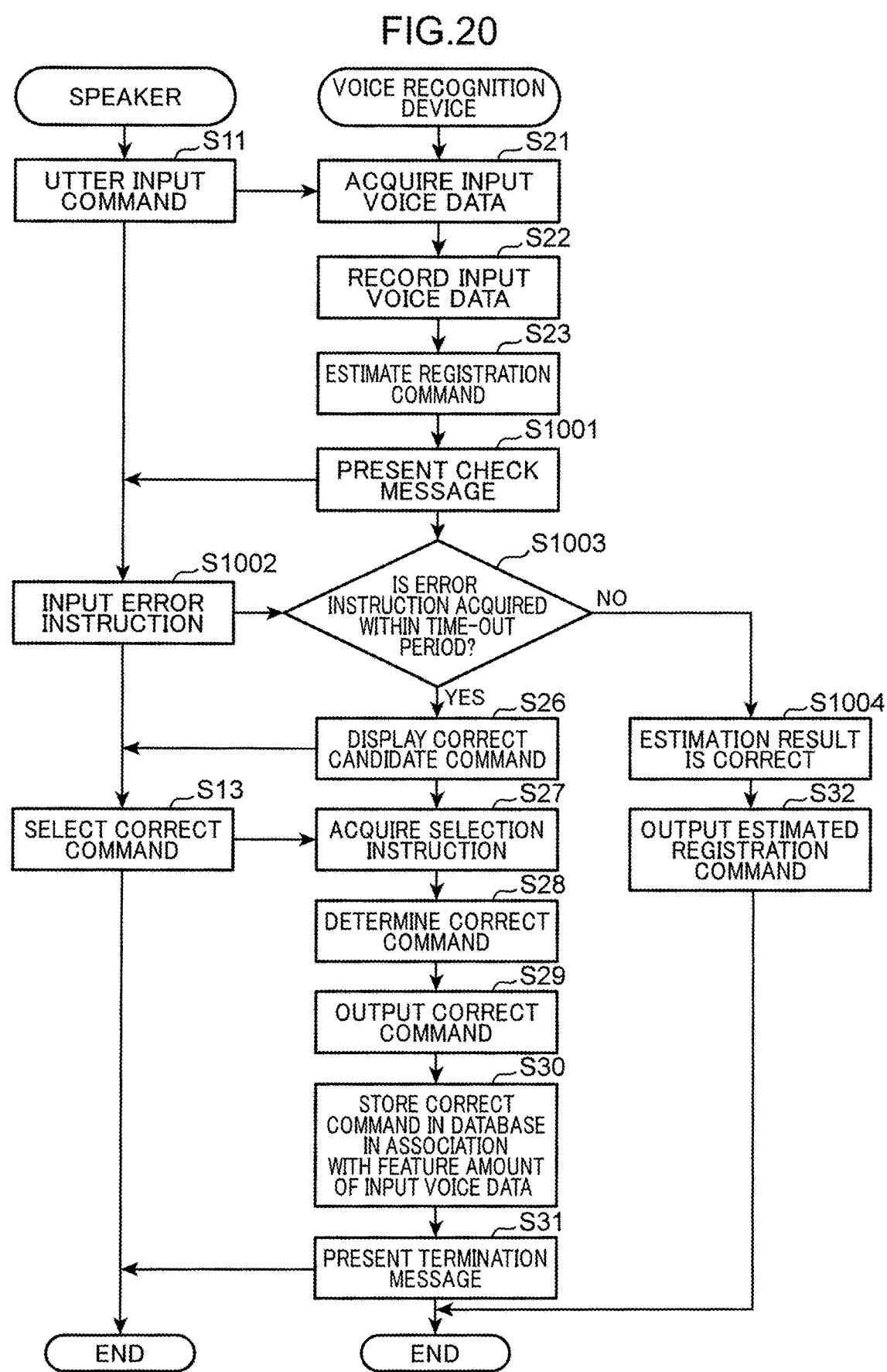
FIG. 20 is a flowchart in the modification of the first embodiment.

(4) In the first embodiment, the presentation unit 33 may output, to at least one of the display 6 and the loudspeaker 5, a check message for prompting input of an error instruction only in the case where the estimation result is an error to present the estimation result. FIG. 20 is a flowchart in the modification of the first embodiment. In FIGS. 20 and 3, the same processing are denoted by the same reference signs, and the description thereof will be omitted.

Figure 21:
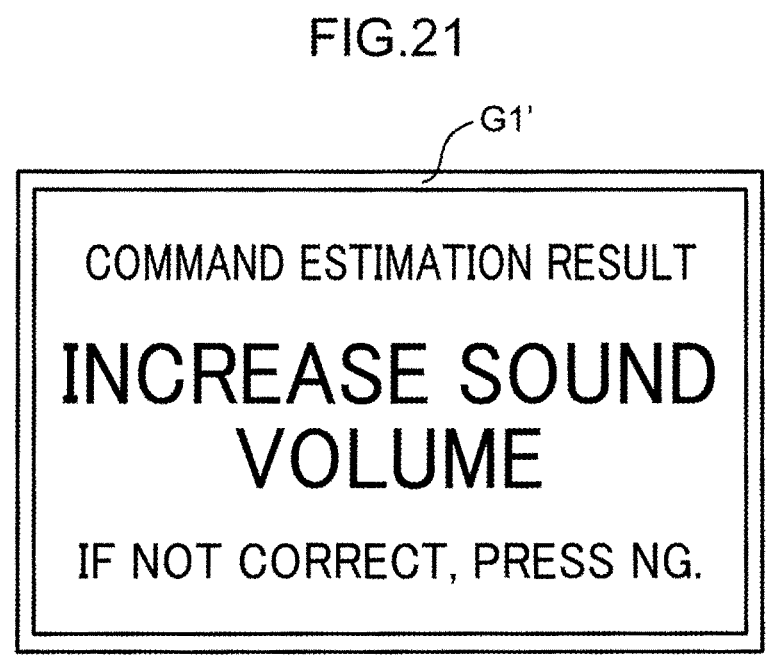

In step S1001 following step S23, the presentation unit 33 presents a check message to the speaker. FIG. 21 is a diagram illustrating an example of a check screen G1' showing the check message in the modification of the first embodiment. The difference between the check screen G1' and the check screen G1 is that the check screen G1 shows a message "please press OK or NG", whereas the check screen G1' shows a message "please press NG if there is an error". That is, in the message of the check screen G1', the input of the error instruction is prompted only in a case where the estimation result is an error.

In step S1002, the speaker who has determined that the estimation result "increase sound volume" shown on the check screen G1' is an error inputs an error instruction using the operation unit 7. In this case, the speaker presses the error button 601 as described in FIG. 6.

On the other hand, in step S1002, the speaker who has determined that the estimation result "increase sound volume" shown on the check screen G1' is accurate inputs nothing using the operation unit 7.

In step S1003, the second acquisition unit 34 determines whether the error instruction has been successfully acquired within a timeout period. The timeout period is a preset time for waiting for the input of an error instruction by the speaker.

In a case where the second acquisition unit 34 acquires the error instruction within the timeout period (YES in step S1003), the processing proceeds to step S26. On the other hand, in a case where the second acquisition unit 34 does not acquire the error instruction within the timeout period (NO in step S1003), the processing proceeds to step S1004.

In step S1004, the determination unit 35 determines that the estimation result estimated by the estimation unit 32 is correct, and the processing proceeds to step S32. Subsequent processing is the same as that in the first embodiment.

According to this modification, the error instruction may be input only in the case where the estimation result is an error, and thus the input load for the speaker can be reduced.

Figure 22:
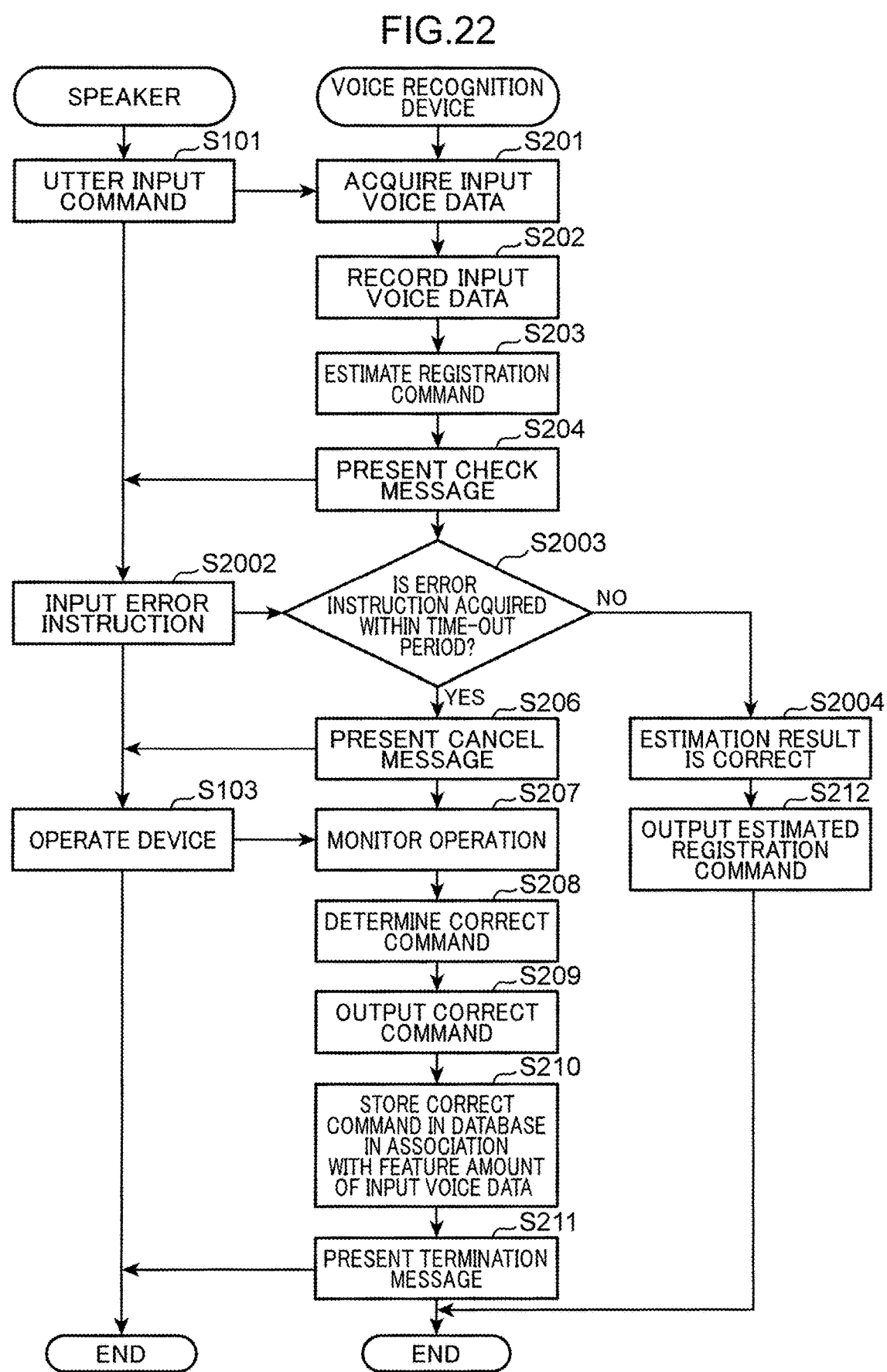
FIG. 22 is a flowchart in a modification of the second embodiment.

(5) In the second embodiment, the presentation unit 33 may outputs, to at least one of the display 6 and the loudspeaker 5, a check message for prompting input of an error instruction only in the case where the estimation result is an error to present the estimation result. FIG. 22 is a flowchart in a modification of the second embodiment. In FIGS. 22 and 11, the same processing are denoted by the same reference signs, and the description thereof will be omitted.

In step S2001, the presentation unit 33 presents a check message to the speaker. In this case, the presentation unit 33 presents the check screen G1' described in the modification of the first embodiment to the speaker.

In step S2002, the speaker who has determined that the estimation result "increase sound volume" shown on the check screen G1' is an error inputs an error instruction using the operation unit 7. In this case, the speaker presses the error button 601 as described in FIG. 6.

On the other hand, in step S2002, the speaker who has determined that the estimation result "increase sound volume" shown on the check screen G1' is correct inputs nothing using the operation unit 7.

In step S2003, the second acquisition unit 34 determines whether the error instruction has been successfully acquired within a timeout period. In a case where the second acquisition unit 34 acquires the error instruction within the timeout period (YES in step S2003), the processing proceeds to step S206. On the other hand, in a case where the second acquisition unit 34 does not acquire the error instruction within the timeout period (No in step S2003), the processing proceeds to step S2004.

In step S2004, the determination unit 35A determines that the estimation result estimated by the estimation unit 32 is correct, and the processing proceeds to step S212. Thereafter, the same processing as that of the second embodiment is executed.

According to this modification, the error instruction may be input only in the case where the estimation result is an error, and thus the input load for the speaker can be reduced.

Figure 23:
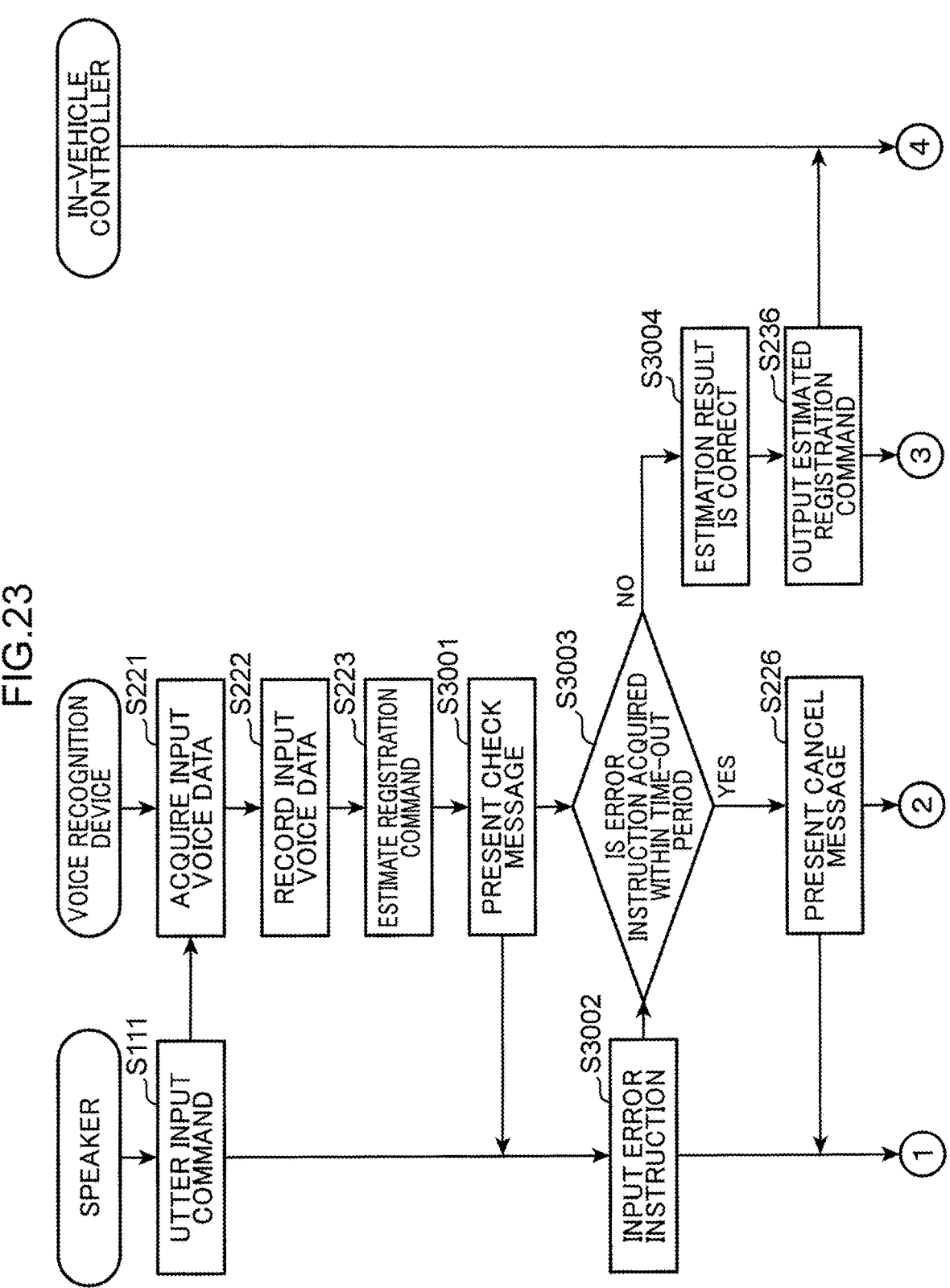
FIG. 23 is a flowchart in a modification of the third embodiment.

(6) In the third embodiment, the presentation unit 33 may output, to at least one of the display 6 and the loudspeaker 5, a check message for prompting input of an error instruction only in the case where the estimation result is an error to present the estimation result. FIG. 23 is a flowchart in a modification of the third embodiment. In FIGS. 23 and 15, the same processing are denoted by the same reference signs, and the description thereof will be omitted. Note that a flowchart following FIG. 23 is identical to FIG. 16.

In step S3001, the presentation unit 33 presents a check message to the speaker. In this case, the presentation unit 33 presents the check screen G1' described in the modification of the first embodiment to the speaker.

In step S3002, the speaker who has determined that the estimation result "increase sound volume" shown on the check screen G1' is an error inputs an error instruction using the operation unit 7. In this case, the speaker presses the error button 601 as described in FIG. 6.

On the other hand, in step S3002, the speaker who has determined that the estimation result "increase sound volume" shown on the check screen G1' is correct inputs nothing using the operation unit 7.

In step S3003, the second acquisition unit 34 determines whether the error instruction has been successfully acquired within a timeout period. In a case where the second acquisition unit 34 acquires the error instruction within the timeout period (YES in step S3003), the processing proceeds to step S226. On the other hand, in a case where the second acquisition unit 34 does not acquire the error instruction within the timeout period (No in step S3003), the processing proceeds to step S3004.

In step S3004, the determination unit 35B determines that the estimation result estimated by the estimation unit 32 is correct, and the processing proceeds to step S236. Thereafter, the same processing as that of the third embodiment is executed.

According to this modification, the error instruction may be input only in the case where the estimation result is an error, and thus the input load for the speaker can be reduced.

INDUSTRIAL APPLICABILITY

The present disclosure is useful in a technical field where an input command of a device such as a mobile body is input using voice.

The invention claimed is:

1. A voice recognition device that performs voice recognition on a command of a mobile body, the device comprising:
   a database storing a plurality of pieces of registration voice data of a plurality of registration commands uttered by a speaker in advance; and
   a processor that performs operations including:
   acquiring input voice data of an input command uttered by the speaker who gets on the mobile body;
   comparing the plurality of pieces of registration voice data with the input voice data to estimate a registration command corresponding to the input command;
   presenting an estimation result;

acquiring an error instruction indicating that the estimation result is an error;

determining, in a case where the error instruction is acquired, a correct command corresponding to the input command based on an operation by the speaker;

controlling the mobile body based on the correct command;

storing, in the database, the correct command and the input voice data in the database in association with each other, to update the database; and repeating at least the acquiring input voice data, and the comparing using the updated database, wherein, in the determining, the processor estimates a correct command based on a monitoring result of an operation on the mobile body after input of the error instruction, and presents, in a case where stopping of the mobile body is detected, the estimated correct command, acquires a check instruction for the estimated correct command, and determines the correct command based on the check instruction.

2. The voice recognition device according to claim 1, wherein, in the determining, the processor presents a plurality of correct candidate commands, acquires a selection instruction for selecting one correct candidate command from among the plurality of correct candidate commands, and determines the one correct candidate command as the correct command.

3. The voice recognition device according to claim 2, wherein the processor presents the plurality of registration commands sorted in descending order of similarity between the input voice data and the plurality of pieces registration voice data, as the plurality of correct candidate commands.

4. The voice recognition device according to claim 1, wherein the processor monitors, after input of the error instruction, an operation input to the mobile body and determines the correct command based on a monitoring result.

5. The voice recognition device according to claim 1, wherein, in the determining, the processor holds, in a memory, the input voice data corresponding to the input command to which the error instruction is input, and presents, in the case where the stopping of the mobile body is detected, the estimated correct command in conjunction with reproduction of the input voice data held in the memory.

6. The voice recognition device according to claim 5, wherein the processor presents, in a case where the check instruction indicating that the estimated correct command is an error is acquired, the plurality of registration commands as correct candidate commands, acquires a selection instruction for selecting one correct candidate command from among the plurality of registration commands, and determines the one correct candidate command as the correct command.

7. The voice recognition device according to claim 6, wherein the processor presents the plurality of registration commands sorted in descending order of similarity between the plurality of pieces of registration voice data and the input voice data, as the correct candidate command.

8. The voice recognition device according to claim 1, wherein the processor compares a feature amount between the plurality of pieces of registration voice data and the input voice data to estimate the registration command corresponding to the input command.

9. The voice recognition device according to claim 1, wherein the processor compares a feature amount between the input voice data and voices of a plurality of registration speakers to identify a registration speaker corresponding to the speaker, and compares registration voice data of the plurality of registration commands with the input voice data for the identified registration speaker to estimate the registration command corresponding to the input command.

10. The voice recognition device according to claim 1, wherein the processor presents a message for prompting input of the error instruction only in a case where the estimation result is an error.

11. The voice recognition device according to claim 10, wherein the processor determines the correct command based on the operation by the speaker in a case where the error instruction is acquired within a predetermined timeout period, and determines that the estimation result is correct in a case where the error instruction is not acquired within the predetermined timeout period.

12. A voice recognition method in a voice recognition device that performs voice recognition on a command of a mobile body, the voice recognition method comprising:

acquiring input voice data of an input command uttered by a speaker who gets on the mobile body;

acquiring a plurality of registration commands uttered by the speaker in advance from a database;

comparing the plurality of registration commands with the input voice data to estimate a registration command corresponding to the input command;

presenting an estimation result;

acquiring an error instruction indicating that the estimation result is an error;

determining, in a case where the error instruction is acquired, a correct command corresponding to the input command based on an operation by the speaker;

controlling the mobile body based on the correct command;

storing, in the database, the correct command and the input voice data in association with each other, to update the database; and repeating at least the acquiring input voice data, the acquiring a plurality of registration commands from the updated database and the comparing using the updated database, wherein the determining includes:

estimating a correct command based on a monitoring result of an operation on the mobile body after input of the error instruction, and presenting, in a case where stopping of the mobile body is detected, the estimated correct command, acquiring a check instruction for the estimated correct command, and determining the correct command based on the check instruction.

13. A non-transitory computer readable recording medium storing a voice recognition program for causing a computer to function as a voice recognition device that performs voice recognition on a command of a mobile body, the program for causing the computer to perform:

acquiring input voice data of an input command uttered by a speaker who gets on the mobile body;

acquiring registration voice data of a plurality of registration commands uttered by the speaker in advance from a database;

comparing each piece of the registration voice data with the input voice data to estimate a registration command corresponding to the input command;

presenting an estimation result;

acquiring an error instruction indicating that the estimation result is an error;

determining, in a case where the error instruction is acquired, a correct command corresponding to the input command based on an operation by the speaker;

controlling the mobile body based on the correct command;

storing, in the database, the correct command and the input voice data in association with each other, to update the database; and repeating at least the acquiring input voice data, the acquiring a plurality of registration commands from the updated database and the comparing using the updated database, wherein the determining includes:

estimating a correct command based on a monitoring result of an operation on the mobile body after input of the error instruction, and presenting, in a case where stopping of the mobile body is detected, the estimated correct command, acquiring a check instruction for the estimated correct command, and determining the correct command based on the check instruction.

*     *     *     *     *